United States Patent [19]
Fukuhara et al.

[11] Patent Number: 5,471,215
[45] Date of Patent: Nov. 28, 1995

[54] RADAR APPARATUS

[75] Inventors: Hiroshige Fukuhara, Yokosuka; Hiroyuki Kamishima, Kanagawa; Toshiro Muramatsu, Zushi, all of Japan

[73] Assignee: Nissan Motor Co., Ltd., Kanagawa, Japan

[21] Appl. No.: 254,827

[22] Filed: Jun. 6, 1994

[30] Foreign Application Priority Data

Jun. 28, 1993 [JP] Japan ................................. 5-156643

[51] Int. Cl.⁶ ............................................. G01S 13/93
[52] U.S. Cl. ............................... 342/70; 342/71; 342/72
[58] Field of Search ................................. 342/70, 71, 72

[56] References Cited

U.S. PATENT DOCUMENTS

| | | | |
|---|---|---|---|
| 3,806,861 | 4/1974 | Okumura et al. | 342/70 |
| 4,168,499 | 9/1979 | Matsumura et al. | 342/70 |
| 4,308,536 | 12/1981 | Sims, Jr. et al. | 342/70 |
| 4,818,999 | 4/1989 | Kobayashi et al. | 342/59 |
| 5,181,037 | 1/1993 | Komatsu | 342/70 |
| 5,220,331 | 6/1993 | Gunter | 342/70 |
| 5,229,774 | 7/1993 | Komatsu | 342/70 |
| 5,321,407 | 7/1994 | Kikuchi et al. | 342/70 |
| 5,355,118 | 10/1994 | Fukuhara et al. | 340/435 |
| 5,381,153 | 1/1995 | Saito et al. | 342/70 |

FOREIGN PATENT DOCUMENTS

| | | |
|---|---|---|
| 1-46034 | 10/1989 | Japan . |
| 2-2106 | 1/1990 | Japan . |
| 3-171380 | 7/1991 | Japan . |

*Primary Examiner*—John B. Sotomayor
*Attorney, Agent, or Firm*—Lowe, Price, LeBlanc & Becker

[57] ABSTRACT

A low-cost compact radar apparatus measures a distance to a target and the relative speed of the target. The apparatus has a transmitter for transmitting a pulse signal and a receiver for receiving a reflected pulse signal from the target. The received signal is converted into a binary signal, which is sampled by a sampler and is accumulated in a cumulative storage unit. Addresses of the storage unit correspond to an interval between the transmission and reception of the pulse signal. According to the interval, the distance and relative speed of the target are calculated at high speed. The apparatus carries out many accumulation operations, to improve an S/N ratio and speedily detect even a weak reflected signal.

4 Claims, 29 Drawing Sheets

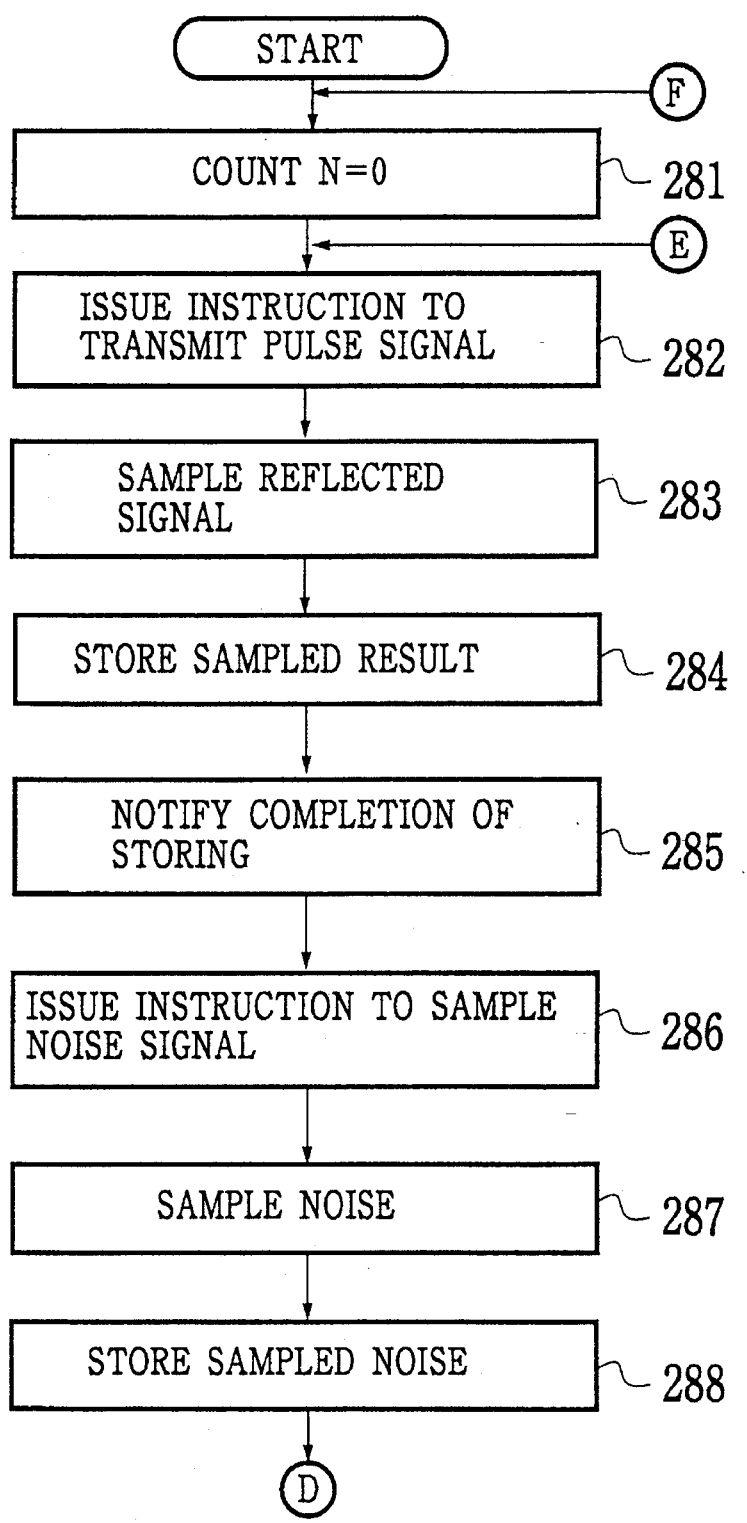

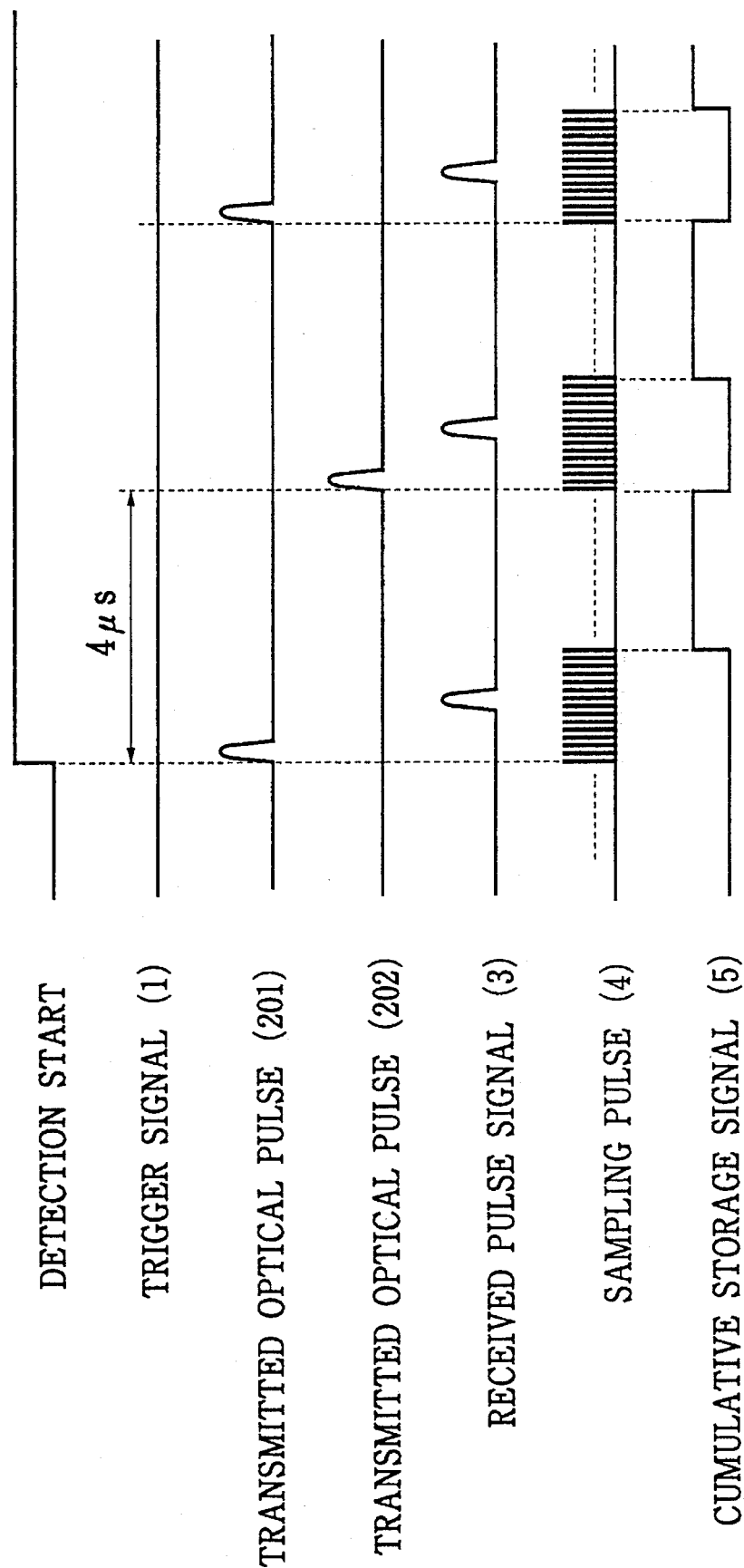

1

RADAR APPARATUS

BACKGROUND OF THE INVENTION

1. Field of the Invention

The present invention relates to a radar apparatus applicable to, for example, a car collision alarm device. In particular, the present invention relates to a low-cost simple radar apparatus that receives a reflected signal, converts the signal into a binary signal, and carries out a cumulative statistical operation on the binary signal, to realize high sensitivity and distance measuring capacity. More precisely, the present invention firstly relates to a radar apparatus for detecting a weak reflected signal, secondary to a radar apparatus for detecting and removing interference signals caused by a radar apparatus of an opposite automobile, thirdly to a radar apparatus for accurately measuring the relative speed of an opposite automobile even with a wide transmission pulse, and fourthly to a durable, reliable radar apparatus installed on a vehicle, to speedily detect a target.

2. Description of the Related Art

A radar apparatus is applicable to measuring a distance between vehicles and providing a car collision alarm. The radar apparatus emits a radio or laser pulse signal toward a car running ahead, receives a reflected pulse signal from the car ahead, and calculates a distance between the cars according to an interval between the transmission and reception of the pulse signal. The radar apparatus, therefore, has a transmitter for transmitting the radio or laser pulse signal toward the car ahead and a receiver for receiving the reflected pulse signal and converting it into an electric signal. The radar apparatus still has a controller for controlling the timing of emitting the pulse signal, and a time measurement unit connected to the receiver, for measuring the interval between the transmission and reception of the pulse signal.

The transmitter transmits a pulse signal in synchronization with a trigger pulse that is repeatedly provided at intervals of Tr under the control of the controller. When the amplitude of a reflected pulse signal from an external target exceeds a threshold Vth, the receiver provides a detection signal. This kind of conventional radar apparatus has some problems.

The reflected pulse signal usually includes internal and external noise. Accordingly, the threshold Vth must be relatively high to avoid detection errors due to the noise. The noise is generally random noise having a Gaussian distribution. When the noise has an instantaneous amplitude of n, the probability distribution P(n) thereof is a probability density function demonstrating a Gaussian distribution with an average of zero and a variance of $\sigma^2$ where $\sigma$ is a standard deviation. The probability density function P(n) is expressed as follows:

$$P(n) = \frac{1}{\sqrt{2\pi\sigma^2}} \exp\left(-\frac{n^2}{2\sigma^2}\right) \quad (1)$$

In the expression (1), the a $\sigma^2$ is noise equivalent power and the $\sigma$ is the effective value thereof. When this noise is contained in a signal having an amplitude of s, the probability density function P(n-s) thereof is expressed as follows:

$$P(n-s) = \frac{1}{\sqrt{2\pi\sigma^2}} \exp\left\{-\frac{(n-s)^2}{2\sigma^2}\right\} \quad (2)$$

Accordingly, the probability of (n-s)≦x with t=(n-s)/σ is expressed as follows:

$$\phi(x) = \int_{-\infty}^{x} P(t)dt \quad (3)$$

For example, $\phi$ (1)=0.84134, $\phi$ (2)=0.97725, and $\phi$ (3)= 0.99865. To correctly detect a reflected signal in the probability of 99.865% from a target at a required distance, the output power of a pulse signal to be transmitted must be determined with a threshold of 3σ, and amplitude higher than the threshold by 3σ, and a peak value six times larger than the effective value σ of the noise. This corresponds to an S/N ratio of 15.6 dB. According to a radar equation, the level of a reception signal attenuates in proportion to the fourth power of a distance. Accordingly, a long distance is measurable only with an expensive high-power oscillator. Instead of increasing output power, reception strength may be increased. This requires, however, a wide antenna that increases the shape and weight of a radar head, which will be hardly installed on a vehicle. For the safety of the human body, the output power must be low according to safety criteria. This will hardly realize a required detection level.

Japanese Laid-Open Patent Nos. 1-46034 and 2-2106 disclose a method of improving reception sensitivity to a weak signal. This method is applicable to receiving a cyclic signal such as a loran-C signal. The method converts the signal into a binary signal involving positive and negative values. The binary signal is sampled and accumulated in a RAM for a given period under the control of a microcomputer. According to the contents of the memory, the existence, S/N ratio, and occurrence point of the signal are detected. The accumulation of data greatly improves the detectable S/N ratio of a weak signal. If a long detection time is allowed, this method is effective to a signal such as the loran-C signal having a relatively long period. When this method is applied to receiving a radar signal, some problems arise. Since the reception strength of a radar signal is proportional to the fourth power of a distance, sensitivity must be improved 16 times to double a detection distance. To improve the sensitivity by calculation, the improvement is proportional to the one second power of the number of accumulation operations. Accordingly, the sensitivity will be improved 16 times if the number of accumulation operations is increased by $16^2$=256 times. A period of repetitive transmission of a radar pulse must be as short as possible. Since the conventional method employs the microcomputer to control the RAM to accumulate radar pulses, a time necessary for sampling and accumulating the pulses is determined by the clock and instruction cycle of the microcomputer. This results in limiting the period of repetitive transmission of the radar pulse. Accordingly, it is difficult to greatly increase the number of accumulation operations to improve the sensitivity. When the radar apparatus is applied to a car collision alarm device, it raises other problems. If a like radar apparatus is mounted on an opposite car running toward this side, pulse signals of the radar apparatuses of that and this cars will interfere with each other to hinder correct distance measurement. Not only the pulse signal of the opposite car but also engine sparks, ON/OFF operations of a headlight, an air conditioner, and a wiper, fluctuations in a power source voltage, sunlight, and tunnels cause noise.

Such internal and external noise will resonate to produce a noise signal that may exceed the threshold. Then, the noise signal will be erroneously detected as a reflected signal from a car that is actually nonexistent.

Japanese Laid-Open Patent No. 3-171380 of this applicant explains that it is necessary to measure not only a distance between cars but also a relative speed between the cars when providing a collision alarm. When measuring the relative speed, the conventional radar apparatus has some problems. The conventional pulse radar is capable of measuring only a distance to a target. Accordingly, to measure a relative speed, the conventional radar must increase accuracy to measure a rate of temporal changes. To increase the accuracy, it is necessary to shorten the width of a pulse transmitted from the radar as well as increasing sampling points. To achieve a measuring accuracy of one meter in a measuring range of 130 meters, 130 sampling points must be prepared. This elongates a time for carrying out accumulation operations. In addition, the width of a pulse to be transmitted must be shortened to several nanoseconds. This complicates a transmitter, increases cost, and deteriorates the performance of the radar.

To secure the durability and reliability of light emitting elements of the transmitter, it is necessary to decrease the duty ratio of pulses. This limits a repetition period of pulses. Namely, if the repetition period is shortened to speedily measure a distance, the durability and reliability of the light emitting elements decrease. On the other hand, if the repetition period is extended, it will take a long time to measure a distance.

SUMMARY OF THE INVENTION

A first object of the present invention is to provide a low-cost, compact, simple radar apparatus for speedily sampling, accumulating, and storing received signals, to detect even a very weak reflected signal at high speed.

A second object of the present invention is to provide a low-cost, compact, simple radar apparatus for speedily sampling, accumulating, and storing received signals, to accumulate more data and improve sensitivity in detecting a reflected signal.

A third object of the present invention is to provide a radar apparatus for transmitting a low-power pulse signal that is safe to the human body, realizing a long measuring range, reducing an interference with pulses from an opposite radar apparatus, and improving the safety and reliability of detecting a target and measuring a distance to the target.

A fourth object of the present invention is to provide a low-cost, compact, simple radar apparatus for speedily measuring the relative speed of a target, detecting fluctuations in noise levels in advance, and preventing an erroneous detection of reflected signals.

A fifth object of the present invention is to provide a low-cost, compact, simple radar apparatus with a radar head (in particular, light emitting elements) having improved durability and reliability.

In order to accomplish the objects, the present invention provides a radar apparatus having a transmitter for transmitting a signal such as a laser beam signal, an electromagnetic signal, or a sound signal, a receiver for receiving a signal such as a laser beam signal, an electromagnetic signal, or a sound signal reflected by an external target, a sampler for repeatedly sampling the received signal at predetermined intervals, an accumulator for accumulating the sampled data according to the contents thereof, a storage unit for storing the accumulated data, a controller for controlling the transmitter, sampler, accumulator, and storage unit, and a decision unit for reading the data out of the storage unit and determining whether or not the data contain a reflection signal from the target. The controller controls the transmitter to transmit a pulse signal having a predetermined duration and pulse width. The pulse signal is reflected by a target and is received by the receiver with a delay time of Td that is proportional to a distance to the target. The sampler is a shift register for sequentially shifting and storing sampled data. The received signal is converted into a binary signal according to positive and negative phases thereof. The accumulator accumulates data transferred from the sampler only when the data are positive. The storage unit has memories Ml to Mn corresponding to n sampling pulses produced in each sampling period and accumulating the sampled data. After the end of an accumulation cycle, the accumulated data are transferred to the decision unit.

The decision unit determines whether or not the data include a reflected pulse from the target and calculates a delay time Td, to measure a distance to the target. The sampling points, i.e., the addresses of the memories Ml to Mn correspond to the delay time Td and distance to the target. According to a shift in the sampled points, i.e, the memories Ml to Mn, of reflected pulses from the target, the relative speed of the target is measured. Accordingly, the relative speed is correctly measurable even if the pulse width of the transmitted signal is wide. The present invention optionally selects a sampling clock frequency to improve the sampling, accumulating, and storing operations. This allows increasing the number of accumulation operations. The larger the number of the accumulation operations, the smaller the standard deviation due to noise, thereby improving the S/N ratio of and sensitivity to a reflected signal.

BRIEF DESCRIPTION OF THE DRAWINGS

FIG. 25A and 25B is a flowchart showing steps carried out by the third embodiment of the present invention;

FIG. 32 is a timing chart showing the sixth embodiment.

DETAILED DESCRIPTION OF THE EMBODIMENTS

Figure 1:
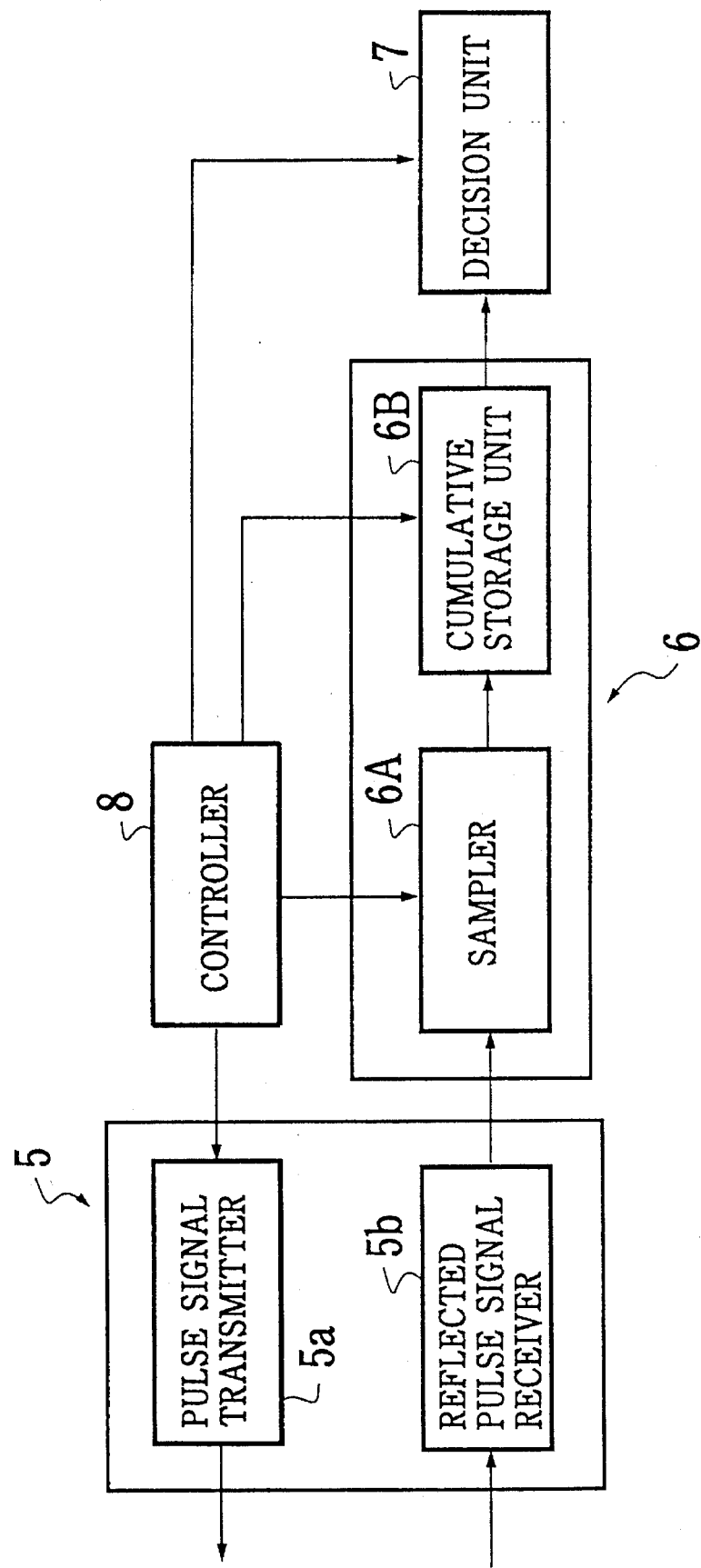
FIG. 1 generally shows a first embodiment of the present invention.

The first to sixth embodiments of the present invention will be explained with reference to the drawings. FIG. 1 generally shows a radar apparatus according to the first embodiment. A radar head 5 has a transmitter 5a for transmitting a pulse signal which may be an optical signal, an electromagnetic signal, or a sonic wave signal, and a receiver 5b for receiving a reflected pulse signal. An operational storage unit 6 has a sampler 6A for sampling the reflected pulse signal and a cumulative storage unit 6B for successively accumulating the sampled data. A decision unit 7 determines whether or not the data stored in the storage unit 6B contain a reflected pulse. A controller 8 controls the radar apparatus as a whole. Namely, the controller 8 controls the transmitter 5a, sampler 6A, cumulative storage unit 6B, and decision unit 7.

Figure 2:
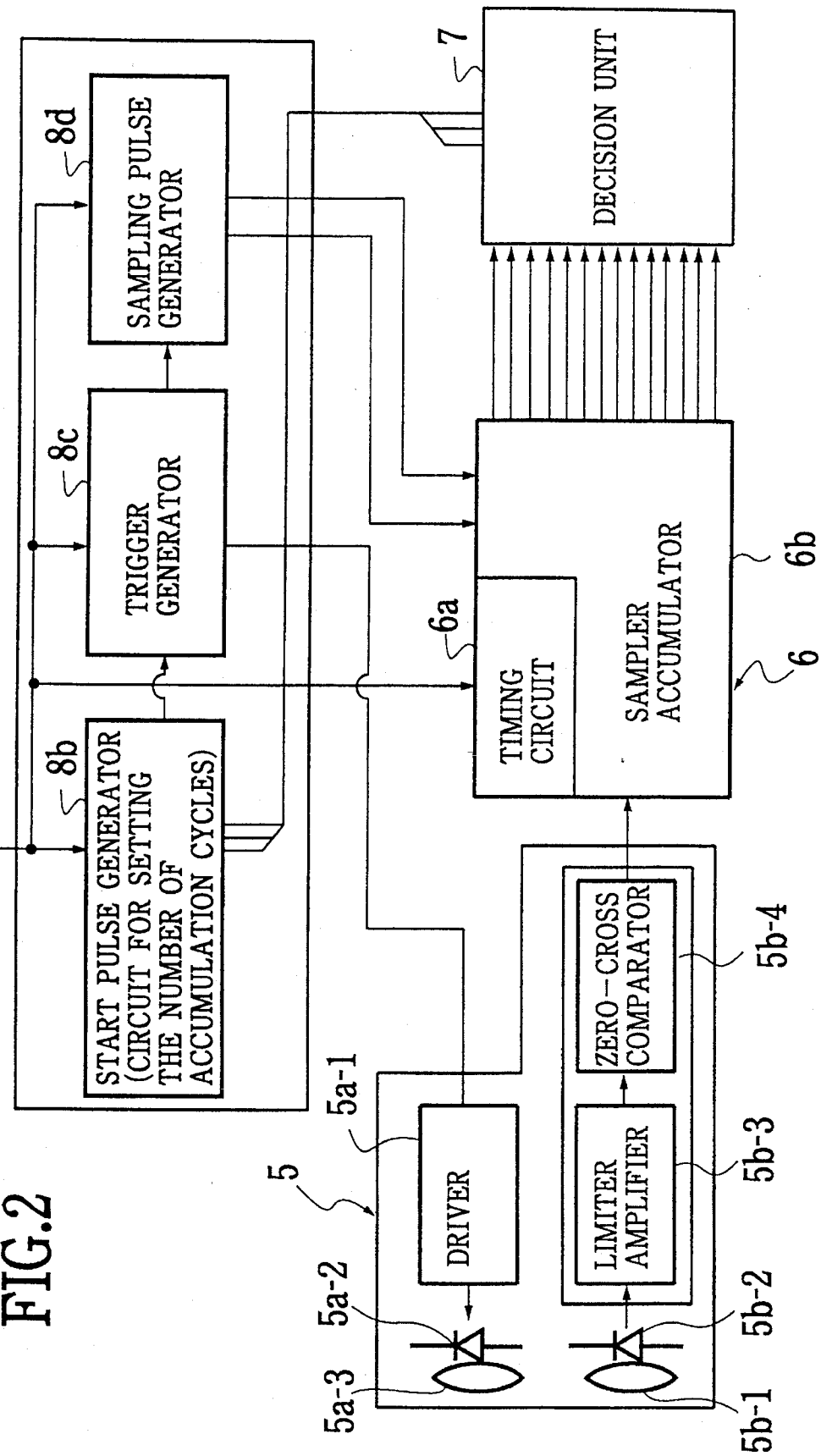
FIG. 2 is a circuit diagram showing an optical radar according to the first embodiment.

FIG. 2 is a circuit diagram showing an optical radar according to the first embodiment. A transmitter 5a for transmitting a pulse signal has a driver 5a-1 operating in response to a trigger pulse provided by a trigger generator 8c, a light emitting element 5a-2 such as an LED or a laser diode driven by the driver 5a-1, and a lens 5a-3 for condensing a light beam provided by the element 5a-2 toward a target. The laser diode may be a $Ga_{1-x}Al_xAs$ double-hetero-structure-semiconductor laser that emits infrared rays, or another semiconductor laser having different wavelengths. A receiver 5b for receiving a reflected pulse signal has a lens 5b-1 for focusing a reflected beam from the target toward a light sensing face of a photosensor 5b-2 such as a photodiode such as an APD and a phototransistor, the photosensor 5b-2 converting the focused light into an electric signal, a limiter amplifier 5b-3 for amplifying the electric signal and converting it into a binary signal (a phase signal or a sign signal) representing binary values such as 1 and 0, and a zero-cross comparator 5b-4 for converting the binary signal into logic levels, for example, 5 V and 0 V. The photosensor 5b-2 may have the same forbidden band Eg as that of the light emitting element 5a-2, to receive light in high sensitivity.

The operative storage unit 6 has a timing circuit 6a for counting the sampling timing of a reflected signal according to a clock signal provided by a clock oscillator 8a, and a sampler accumulator 6b for sampling a zero-cross signal provided by the comparator 5b-4 according to a sampling pulse provided by a sampling pulse generator 8d and accumulating sampled data. The decision circuit 7 has a function of providing a predetermined number of pulses (start pulses) for driving the light emitting element 5a-2 and a function of fetching the data stored in the sampler accumulator 6b and determining whether or not the data contain a reflected pulse from a target. The controller 8 has the start pulse generator 8b for providing a start pulse according to a clock signal provided by the clock oscillator 8a and setting the number of accumulation operations carried out on sampled data, the trigger generator 8c for providing the driver 5a-1 with a trigger pulse according to the clock signal, and the sampling pulse generator 8d for recognizing a start point according to the clock signal as well as sampling start and end points according to instructions from the start pulse generator 8b, to control the operational storage unit 6.

Figure 3:
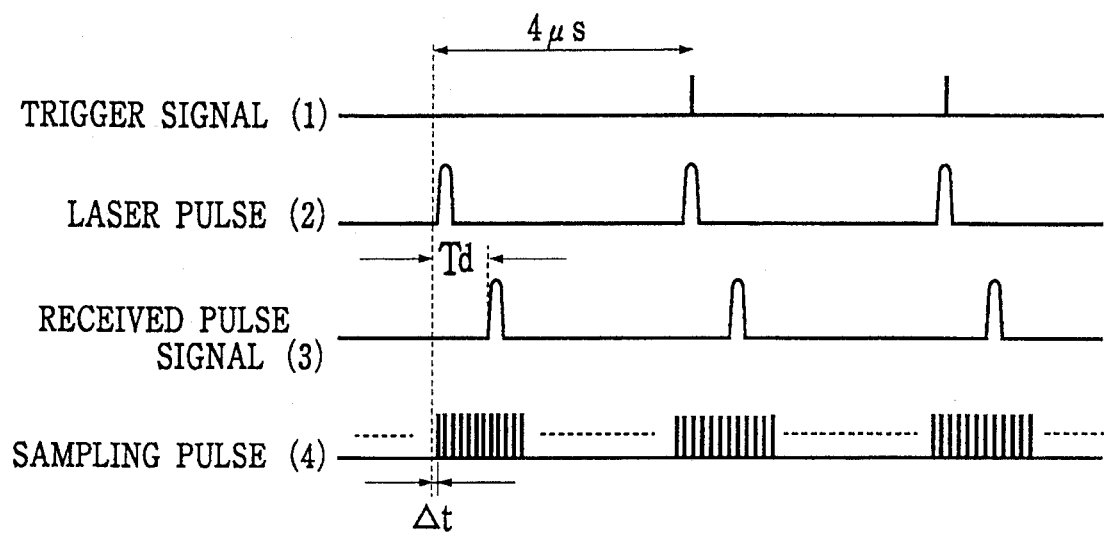
FIG. 3 is a timing chart showing signals employed by the radar of FIG. 2.
Figure 4:
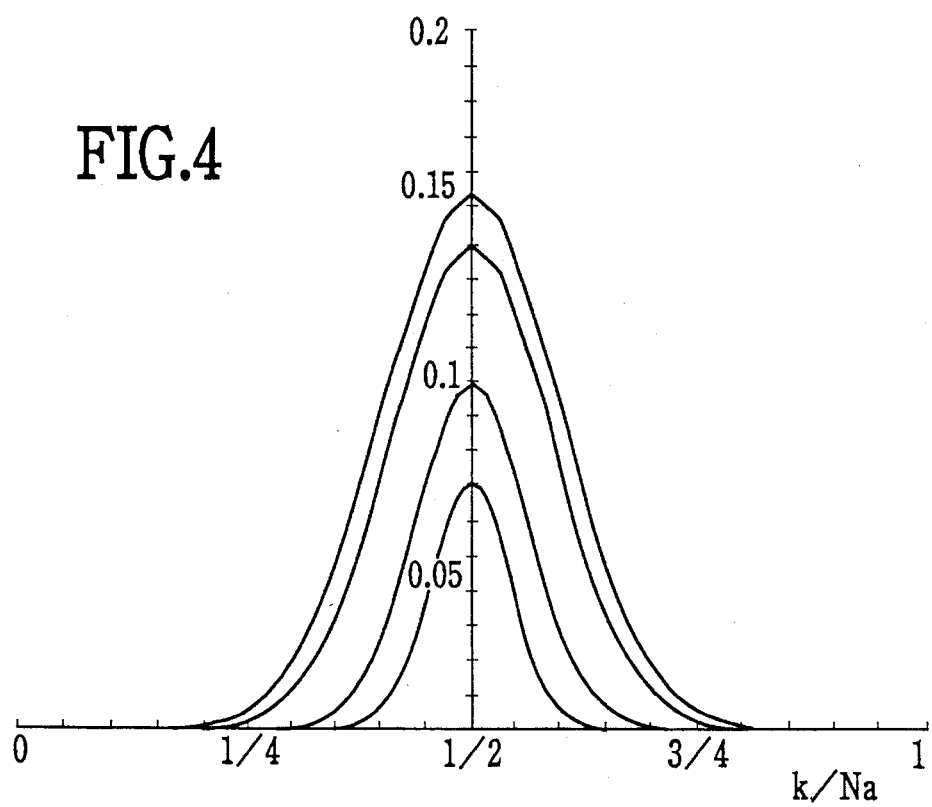
FIG. 4 shows a probability distribution of an accumulated value k indicating the number of "ones" when a received signal is sampled and converted into a binary signal (1 or 0) Na times.

FIG. 3 is a timing chart showing various signals. In this example, the light emitting element 5a-2 is a semiconductor laser diode. A trigger pulse (1) is repeatedly generated by the trigger generator 8c at intervals of, for example, four microseconds. A laser pulse signal (2) is transmitted toward an external target from the laser diode 5a-2, which is controlled by the trigger generator 8c and driver 5a-1. The laser pulse signal (2) is provided in synchronization with the trigger pulse (1). The laser pulse signal (2) may be an optical signal, a radio signal, or an ultrasonic signal. A pulse signal (3) is received by the limiter amplifier 5b-3 through the lens 5b-1 and photosensor 5b-2. The received pulse signal (3) is checked if it is greater than a threshold Vth of, for example, 0 V and is converted into a binary signal. The received pulse signal (3) is behind the transmitted pulse signal (2) by a delay time Td, which is proportional to a distance to the target. The binary signal is accumulated in the sampler accumulator 6b for an accumulation cycle according to binary values 1 and 0, i.e., positive and negative amplitudes. Sampling pulses (4) are provided by the sampling pulse generator 8d whenever the trigger pulse (1) is provided. The interval of the sampling pulses (4) is Δt, and n pieces of the sampling pulses (4) are provided in response to each trigger pulse (1). The n is, for example, 128. The sampler accumulator 6b has n memories M1 to Mn corresponding to the n sampling pulses, respectively. The memories M1 to Mn are cleared or set to a predetermined value before transmitting the pulse signal (2). The memory M1 accumulates one when a latch circuit provides one in response to a hold timing signal of one. This accumulation operation is carried out up to the memory Mn corresponding to the sampling pulse n. The accumulation operation is repeated for n=N, (for example, 26, 32, 64, or 128) laser pulses (2). The sampler accumulator 6b repeats the accumulation operation Na times according to an instruction from the start pulse generator 8b and provides the decision unit 7 with accumulated data. According to the accumulated data, the decision unit 7 determines whether or not the data contain a reflected pulse from the target. If the reflected pulse is contained, the decision unit 7 measures a transport period of the reflected pulse according to the address of the memory in which the reflected pulse has been detected and the interval A t of the sampling pulses. Namely, the transport period Td is calculated as m·Δ t when the reflected pulse is detected in the "m"th memory. The determination whether or not there is a reflected pulse is carried out according to data stored in the memories. The larger the number N of the accumulation operations, the smaller the standard deviation due to noise. Namely, an S/N ratio is improved $(N)^{1/2}$ times, so that a reflected pulse may be easily discriminated from noise. The high-gain limiter amplifier 5b-3 converts random noise into a rectangular signal, and the zero-cross comparator 5b-4 provides "1" if the signal is positive and "0" if it is negative, to thereby provide a binary noise signal whose probability of occurrence of "1" is equal to that of "0." When the binary noise signal is repeatedly sampled and accumulated, the accumulated data show a binomial probability distribution. Namely, independent N trials corresponding to N sampling operations under the same conditions involve k (equal to an accumulated value k) events of, for example, sampling "1". The probability distribution of k the is expressed as follows:

$$f(k) = {}_{Na}C_k p^k q^{Na-k} \quad (4)$$

$$_{Na}C_k = \frac{N_a!}{N_a!(N_a - k)!} \quad (5)$$

where the p is the probability of "1" occurring in one sampling operation and the q is the probability of "0" occurring in one sampling operation. If there is only noise, p=q=0.5. FIG. 4 shows probability distributions with an accumulated value of k, p=q=0.5, and N=26, 32, 64, and 128. An abscissa represents the accumulated value k normalized by N, i.e., k/N. The range of the k/N becomes smaller around ½ as the number of the accumulation operations increases. If a signal contains such noise, an expected accumulated value $\bar{k}$ and a variance V are expressed as follows:

$$\bar{k} = N \cdot p \quad (6)$$

$$V = N \cdot p \cdot q \quad (7)$$

where the p and q are random noise showing Gaussian distributions, and therefore, are obtained as follows according to the expressions (2) and (3):

$$p = \int_0^\infty P(t)dt \quad (8)$$

$$q = 1 - p \quad (9)$$

where $\sigma^2$ is noise power. Accordingly, s/σ is equal to S/N. Namely, p, q, $\bar{k}$, and V are uniquely determined according to S/N. When $\bar{l}$ is normalized by N, $\bar{k}/N=p$ according to the expression (6), so that it becomes constant irrelevant to N. A standard deviation $V^{1/2}$ is equal to $(Npq)^{1/2}$ according to the expression (7), so that, when it is normalized by N, $(Npq)^{1/2}/N=(pq/n)^{1/2}$. Namely, the standard deviation is reduced to $1/(n)^{1/2}$. This means that the larger the number of the accumulation operations, the smaller the standard deviation due to noise, to easily separate noise from a signal.

Figure 5:
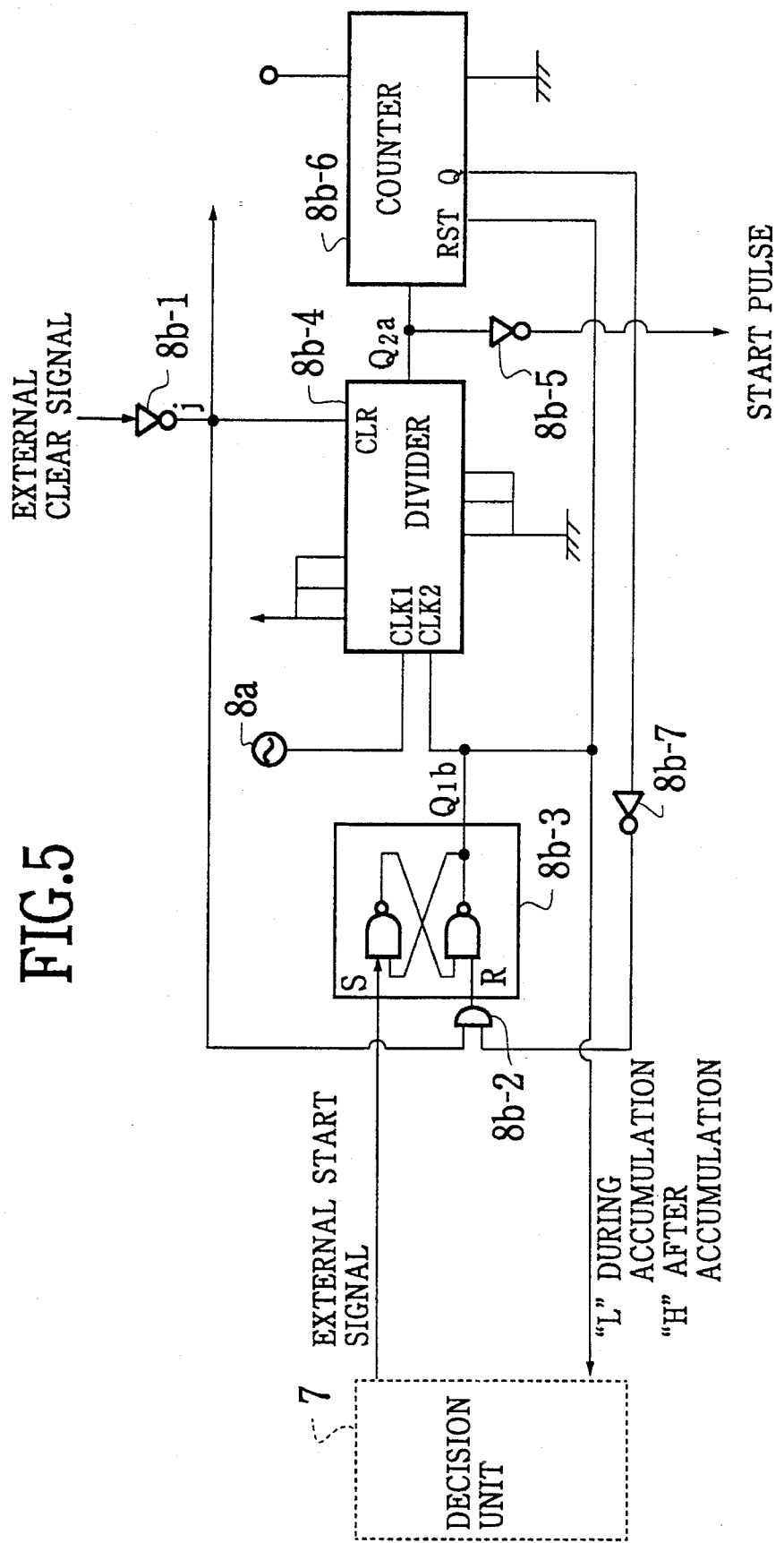
FIG. 5 is a circuit diagram showing a start pulse generator (a circuit for setting the number of accumulation cycles) of FIG. 2.

The accumulation operation will be explained in detail. Components of the controller 8 will be explained in detail at first. FIG. 5 is a circuit diagram showing the start pulse generator (the circuit for setting the number of accumulation operations) 8b. This circuit has an RS flip-flop 8b-3, a divider 8b-4, and a counter 8b-6. The RS flip-flop 8b-3 receives an external start signal from the decision unit 7, as well as an output of an AND gate 8b-2 that provides an AND of an external clear signal and a count end signal from the counter 8b-6. These input signals determine an output Q1b of the RS flip-flop 8b-3. The divider 8b-4 receives an output of the clock oscillator 8a, a control signal j that is an inverted external clear signal provided by an inverter 8b-1, and the output Q1b of the RS flip-flop 8b-3. These input signals determine an output Q2a of the divider 8b-4. The output Q2a is inverted by an inverter 8b-5 into a start pulse. The counter 8b-6 receives the output Q2a of the divider 8b-4 and adds up counts. The counter 8b-6 provides a count continuation signal, which is inverted by an inverter 8b-7 and is transferred to the AND gate 8b-2. The counter 8b-6 also provides an accumulation status signal according to counting conditions. Namely, in the start pulse generator 8b, the output Q1b of the RS flip-flop 8b-3 becomes low (L) in response to the external start signal, to release the inhibit state of the clock input of the divider 8b-4, so that the divider 8b-4 divides a 15-MHz clock signal by 32 to provide start pulses at intervals of four microseconds. The number of start pulses is, for example, 8192. When receiving the 8192th start pulse, the counter 8b-6 provides an output with a 14th bit of high (H) to reset the RS flip-flop 8b-3. This stops the divider 8b-4. The output of the counter 8b-6 is L while the start pulses are being provided, and it becomes H after 8192 start pulses are provided. The output of counter 8b-6 is properly transferred to the decision unit 7.

Figure 6:
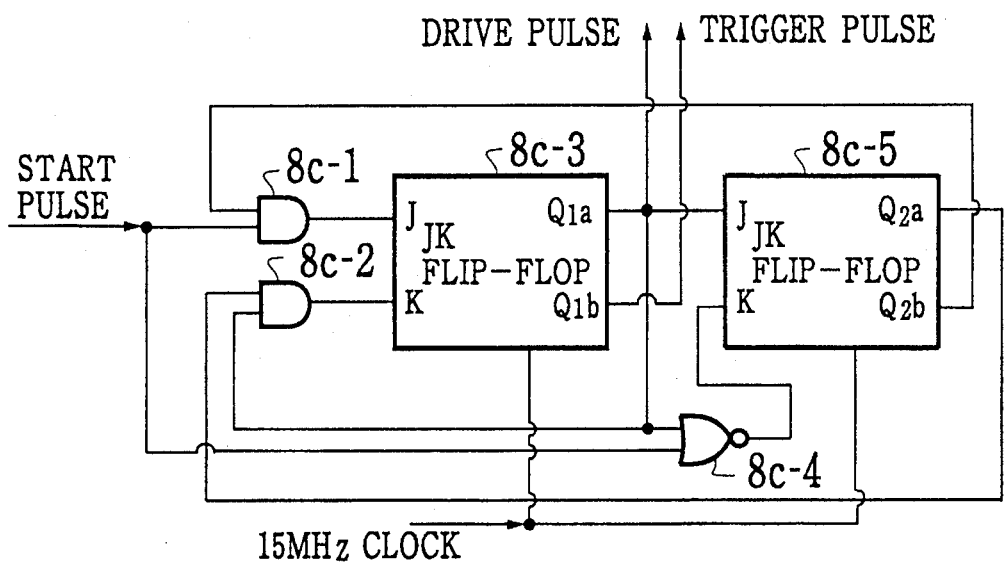
FIG. 6 is a circuit diagram showing a trigger generator of FIG. 2.
Figure 7:
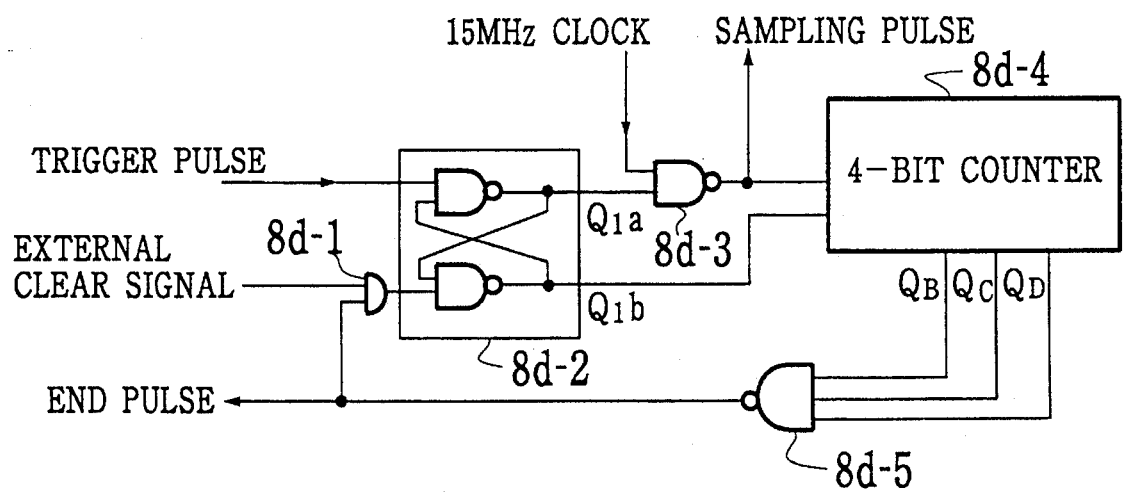
FIG. 7 is a circuit diagram showing a sampling pulse generator of FIG. 2.
Figure 8:
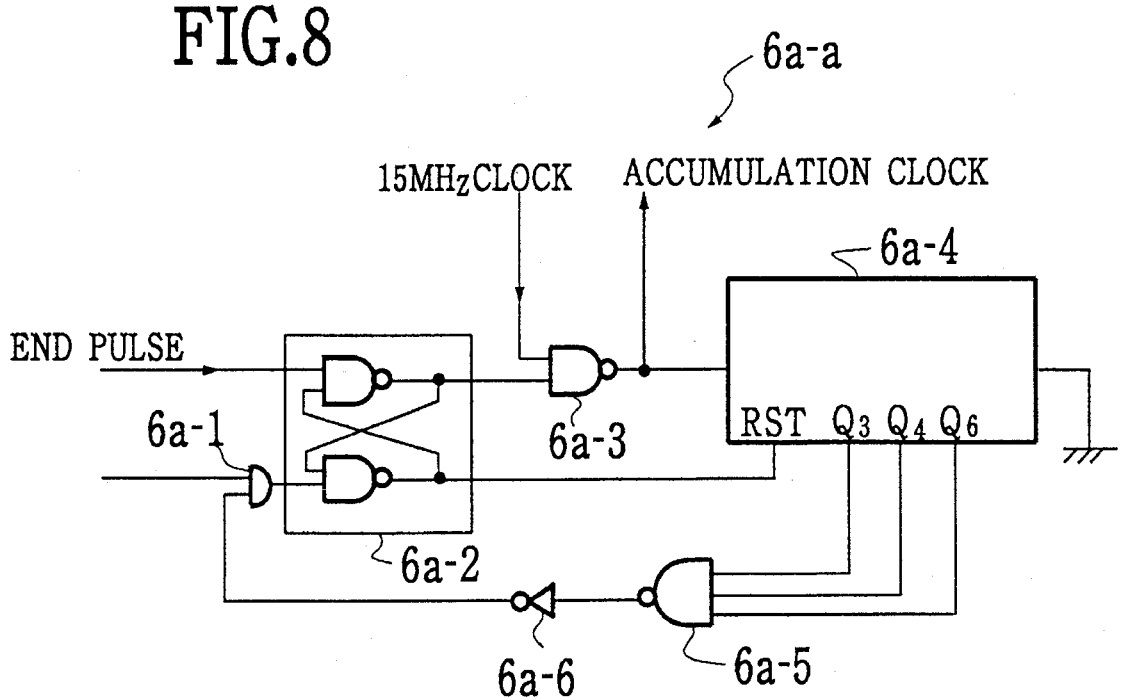
FIG. 8 is a circuit diagram showing an accumulation clock generator that is a part of a timing circuit of FIG.
Figure 9:
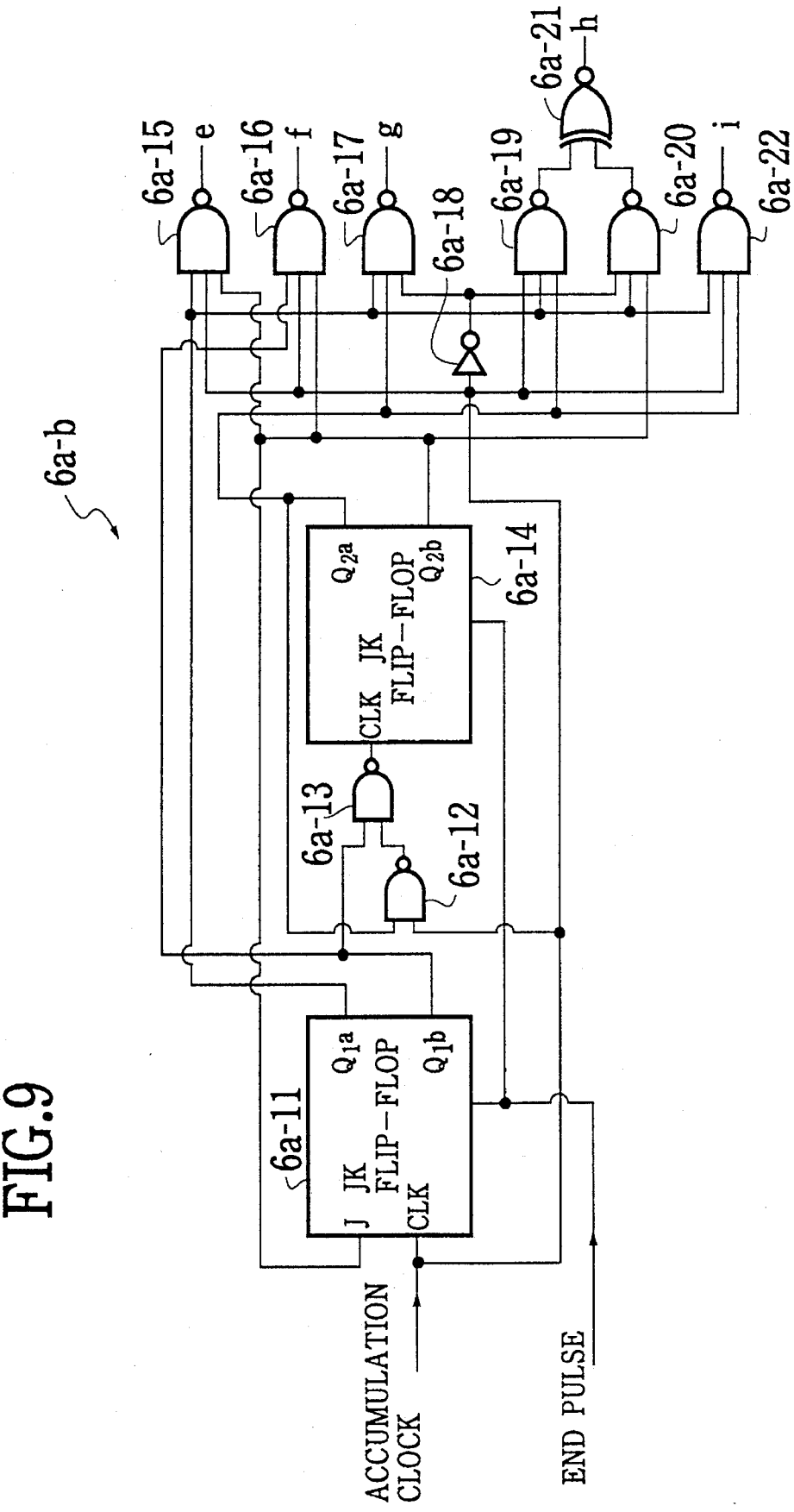
FIG. 9 is a circuit diagram showing a control pulse generator that is a part of the timing circuit of FIG. 2.

FIG. 6 is a circuit diagram showing the trigger generator 8c. The trigger generator 8c has JK flip-flops 8c-3 and 8c-5. The JK flip-flop 8c-3 receives outputs of AND gates 8c-1 and 8c-2. The AND gate 8c-1 provides an AND of a start pulse and an output Q2b of the JK flip-flop 8c5. The AND gate 8c-2 provides an AND of an output Q1a of the JK flip-flop 8c-3 and an output Q2a of the JK flip-flop 8c-5. These input signals determine the outputs Q1a and Q1b of the JK flip-flop 8c-3. The output Q1a is a drive pulse for driving the light emitting element 5a-2 such as an LED, and the output Q1b is a trigger pulse. The JK flip-flop 8c-5 receives an output of a NOR gate 8c-4 that provides a NOR of the output Q1a of the JK flip-flop 8c-3 and the start pulse. These input signals determine the outputs Q2a and Q2b of the JK flip-flop 8c-5. FIG. 7 is a circuit diagram showing the sampling pulse generator 8d. The sampling pulse generator 8d has an RS flip-flop 8d-2 and a four-bit counter 8d-4. The RS flip-flop 8d-2 receives a trigger pulse and an output of an AND gate 8d-1, which provides an AND of an external clear signal and an end pulse. These input signals determine outputs Q1a and Q1b of the RS flip-flop 8d-2. A NAND gate 8d-3 provides a sampling pulse according to a NAND of the output Q1a and a clock signal. The output of the NAND gate 8d-3 is also supplied to the four-bit counter 8d-4 for counting sampling pulses. When outputs QB, QC, and QD of the counter 8d-4 corresponding to bits 2 to 4 simultaneously become H at the 14th sampling pulse, a three-input NAND gate 8d-5 becomes L. This resets the RS flip-flop 8d-2 and stops the output of the NAND gate 8d-3. The output of the three-input NAND gate 8d-5 is provides as an end pulse indicating an end of sampling pulses. FIG. 8 is a circuit diagram showing an accumulation clock generator 6a—a forming the timing circuit 6a. The clock generator 6a—a resembles the sampling pulse generator 8d of FIG. 7. The sampling pulse generator 8d provides sampling pulses in response to a trigger pulse, while the accumulation clock generator 6a—a provides an accumulation clock in response to an end pulse. FIG. 9 shows a control pulse generator 6a-b forming the timing circuit 6a. The control pulse generator 6a-b has two JK flip-flops 6a-11 and 6a-14 and a plurality of NAND gates 6a-15 to 6a-22. The JK flip-flop 6a-11 receives an output Q2b of the JK flip-flop 6a-14 and an accumulation clock. These input signals determine outputs Q1a and of the JK flip-flop 6a-11. The JK flip-flop 6a-14 receives an output of a NAND gate 6a-13, which provides a NAND of the output Q1b of the JK flip-flop 6a-11 and an output of a NAND gate 6a-12. The NAND gate 6a-12 provides a NAND of the accumulation clock and an output Q2a of the JK flip-flop 6a-14. These input signals determine the outputs Q2a and Q2b of the JK flip-flop 6a-14. The NAND gate 6a-15 provides a control signal e (address counter) according the output Q1a of the JK flip-flop 6a-11, accumulation clock, and the output Q2b of the JK flip-flop 6a-14. The NAND gate 6a-16 provides a control signal f (accumulation counter) according to the output Q1b of the JK flip-flop 6a-11, accumulation clock, and the output Q2b of the JK flip-flop 6a-14. The NAND gate 6a-17 provides a control signal g (count up) according to the output Q1a of the JK flip-flop 6a-11, the output Q2a of the JK flip-flop 6a-14, and an inverted accumulation clock from an inverter 6a-18. An XOR (Exclusive-OR) gate 6a-21 provides a control signal h (memory-I/O switching) according to outputs of the NAND gates 6a-19 and 6a-20. The NAND gate 6a-19 provides a NAND of the accumulation clock, the output Q1a of the JK flip-flop 6a-11, and the output Q2a of the JK flip-flop 6a-14. The NAND gate 6a-20 provides a NAND of the inverted accumulation clock, the output Q1a of the JK flip-flop 6a-11, and the output Q2b of the JK flip-flop 6a-14. The NAND gate 6a-22 provides a control signal i (memory write pulse) according to the output Q1a of the JK flip-flip 6a-11, accumulation clock, and the output Q2a of the JK flip-flop 6a-14.

Figure 10:
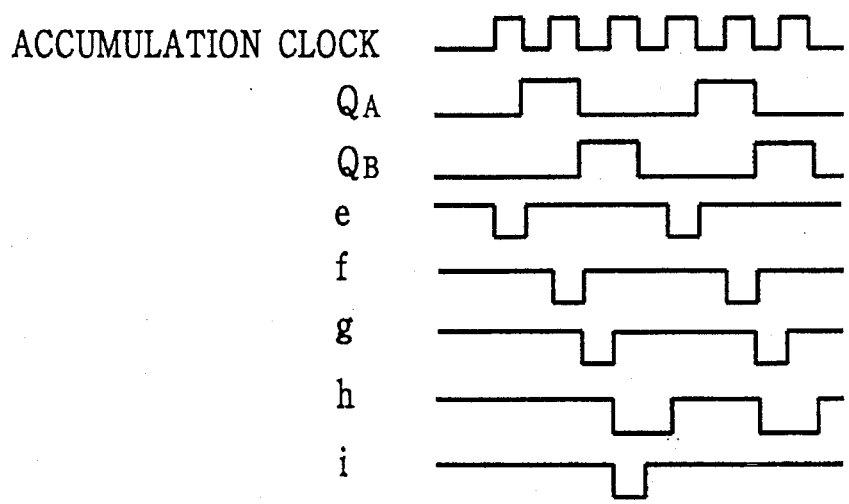
FIG. 10 is a timing chart showing signals provided by the control pulse generator of FIG. 9.

FIG. 10 is a timing chart showing the signals generated by the control pulse generator 6a-b. A reference mark QA represents the output Q1b of the JK flip-flop 6a-11 and QB the output Q2a of the JK flip-flop 6a-14. The control signal e becomes L with the accumulation clock of H, the signal QA of L, and the signal QB of L. The control signal f becomes L with the accumulation clock of H, the signal QA of H, and the signal QB of L. The control signal g becomes L with the accumulation clock of L, the signal QA of L, and the signal QB of H. The control signal h becomes L with the output signal QA of L and the signal QB of H. The control signal i becomes L with the accumulation signal of H, the signal QA of L, and the signal QB of H.

Figure 11:
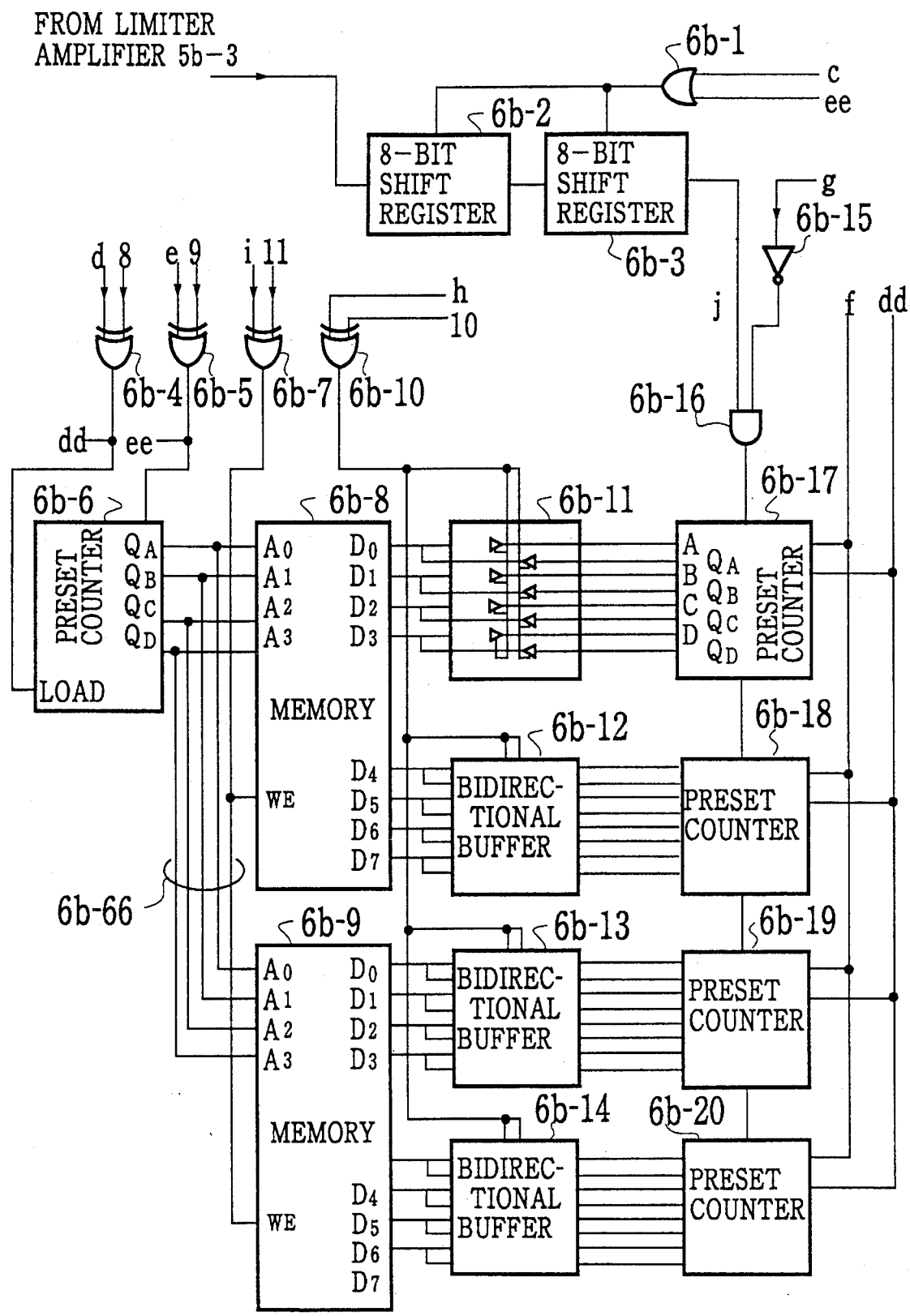
FIG. 11 is a circuit diagram showing a sampler accumulator of FIG. 2.

FIG. 11 is a circuit diagram showing the sampler accumulator 6b. The sampler accumulator 6b has 8-bit shift registers 6b-2 and 6b-3, an address setting preset counter b-6, memories 6b-8 and 6b-9, bidirectional buffers 6b-11 to 6b-14, and cumulative preset counters 6b-17 to 6b-20. The 8-bit shift registers 6b-2 and 6b-3 are cascaded, to sample an output of the limiter amplifier 5b-3 in response to an output of an OR gate 6b-1, which provides an OR of a sampling pulse c and a control signal ee. The shift registers 6b-2 and 6b-3 shift and store the sampled data. The preset counter 6b-6 sets addresses for the memories 6b-8 and 6b-9 according to an output of an XOR gate 6b-4 that receives the control signal d and a control signal 8 of the decision unit 7, and an output of an XOR gate 6b-5 that receives the control signal e,and a control signal 9 of the decision unit 7. The memories 6b-8 and 6b-9 are switched to a read mode or to a write mode according to an output of an XOR gate 6b-7 that receives the control signal i and a control signal 11 of the decision unit 7. The bidirectional buffers 6b-11 to 6b-14 are initially under the read mode to provide data out of the memories 6b-8 and 6b-9 and are switched to another direction according to the control signal h and a control signal 10 of the decision unit 7. Under the read mode, the data of the memories 6b-8 and 6b-9 are loaded to the cumulative preset counters 6b-17 to 6b-20, and under the write mode, the data of the cumulative preset counters 6b-17 to 6b-20 are loaded to the memories 6b-8 and 6b-9. The cumulative preset counters 6b-17 to 6b-20 increment the loaded data according to the control signal f, a control signal dd, and an output of an AND gate 6b-16 that receives an output j of the 8-bit shift register 6b-3 and an inverted control signal g inverted by an inverter 6b-15.

Figure 12:
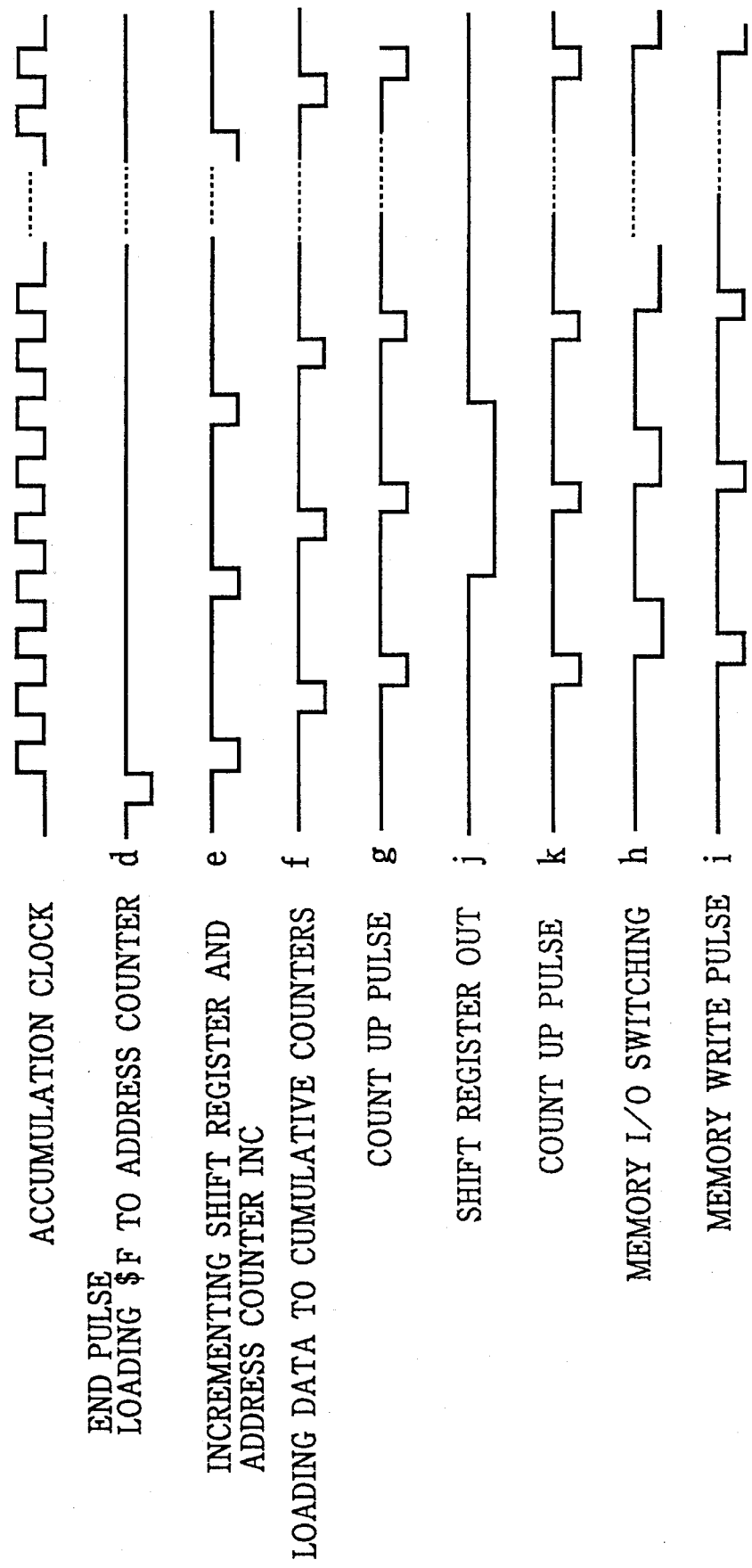
FIG. 12 is a timing chart showing an accumulation operation carried out by the circuit of FIG. 11.

FIG. 12 is a timing chart showing the accumulation operation. When the end pulse d is provided to indicate that the sampling pulse generator 8d has stopped the sampling pulses c, each bit of the preset counter 6b-6 is preset to H, and the cumulative preset counters 6b-17 to 6b-20 are cleared. In synchronization with the end pulse d, the accumulation clock generator 6a—a continuously provides, for example, 42 accumulation clock pulses. According to the control signal e provided by the control pulse generator 6a–b of FIG. 9, the preset counter 6b-6 is incremented, to send $0 to an address bus 6b-66 to select an address zero of the memories 6b-8 and 6b-9 that are in the read mode in advance. Then, memory outputs D0 to D7 provide memory contents at the address zero. At the same time, the control signal e is supplied to the clock terminals of the 8-bit shift register 6b-2 and cumulative preset counter 6b-18, so that the contents of the shift register 6b-2 are shifted by one bit and are provided to the AND gate 6b-16. According to the control signal f, the contents of the memories 6b-8 to 6b-9 are loaded to the cumulative preset counters 6b-17 to 6b-20. When the control signal j is H, the control signal g increments the cumulative preset counters 6b-17 to 6b-20, and if the signal j is L, the increment is not carried out because the control signal g is not provided to the other input of the AND gate 6b-16 that controls the input of the cumulative preset counter 6b-17. The control signal h switches the I/O direction of the bidirectional buffers 6b-11 to 6b-14, to transfer the contents of the cumulative preset counters 6b-17 to 6b-20 to the memories 6b-8 and 6b-9. When the control signal i is provided to the XOR gate 6b-7, the memories 6b-8 and 6b-9 are put in the write mode, and the contents of the cumulative preset counters 6b-17 to 6b-20 are written into the memories at the address zero. As explained above, a memory address corresponding to one bit of the 8-bit shift registers 6b-2 and 6b-3 is read, accumulated, and written with three accumulation clock pulses, so that a set of 14 bits is completely accumulated with 42 pulses. This operation is carried out 8192 times, to provide accumulated data. According to an output of the start pulse generator (the circuit for setting the number of accumulation cycles) 8b, the decision unit 7 determines that the 8192 accumulation cycles have been completed, controls the memories 6b-8 and 6b-9 of the sampler accumulator 6b and the bidirectional buffers 6b-11 to 6b-14, to read the accumulated data out of the memories 6b-8 and 6b-9, determines whether or not the data contain a reflected pulse from a target, and calculates a distance to the target.

Figure 13:
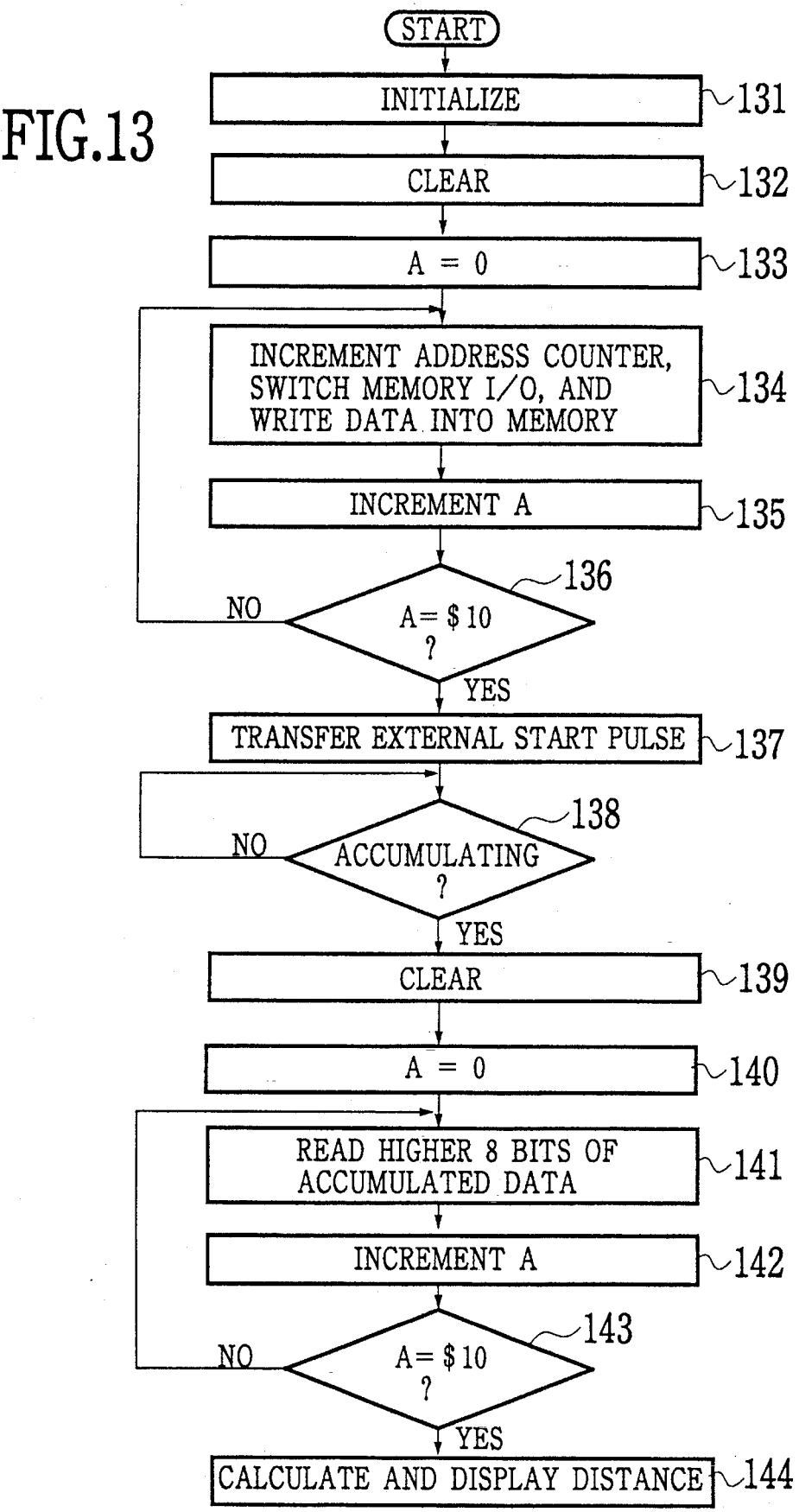
FIG. 13 is a flowchart showing steps carried out by a decision unit of FIG. 2.

FIG. 13 is a flowchart showing steps carried out by the decision unit 7. Step 131 initializes the decision unit 7, to thereby initialize inputs 0 to 7 read by the cumulative storage unit 6 and inputs 8 to 12. At the same time, the control signals 8 to 11 to the XOR gates 6b-4, 6b-5, 6b-7, and 6b-10 are initialized. In step 132, the decision unit 7 clears the divider 8b-4 and counter 8b-6 of the start pulse generator 8b and the preset counter 6b-6 and cumulative preset counters 6b-17 to 6b-20 of the sampler accumulator 6b. Step 133 clears an internal counter of the controller 7. Thereafter, a cumulative memory clear routine is executed. Step 134 provides the control signals 9, 10, and 11 to let the XOR gates 6b-5, 6b-7, and 6b-10 provide output signals. Step 135 increments the address counter. Step 136 determines whether or not the incremented value is equal to $10. These steps increment the 8-bit preset counters 6b-2 and 6b-3 and change the I/O direction of the bidirectional buffers 6b-11 to 6b-14 toward the memories 6b-8 and 6b-9, so that cleared outputs, for example, $00 of the cumulative preset counters 6b-17 to 6b-20 are written into the memories 6b-8 and 6b-9. These steps are repeated by incrementing the 8-bit shift registers 6b-2 and 6b-3, to clear the contents of the memories at addresses $00 to $10. If the step 136 determines that the incremented value is below $10, the step 134 is repeated, and if it is equal to $10, step 137 transfers an external start pulse to the start pulse generator 8b, to start a series of accumulation operations. Step 138 determines whether or not the start pulse generator 8b is providing an accumulation status signal of H. If the signal is not H, the step 138 is repeated. If it is H, it is determined that the accumulation process has been completed, and step clears the preset counter 6b-6, and step 140 clears the internal counter of the decision unit 7. The cumulative memories are put in the read mode, and higher 8 bits are read out of the cumulative memories. Namely, step 141 provides the XOR gate 6b-5-with the control signal 9 to increment the preset counter 6b-6. Step 142 increments the counter. Step 143 determines whether or not the contents read into the memories 6b-8 and 6b-9 are equal to $10. If the incremented value is below $10, the step 141 is repeated, and if it is equal to $10, step S144 calculates a distance to a target according to the accumulated data. The calculated distance, and if necessary, an alarm are displayed on a CRT.

Figure 14:
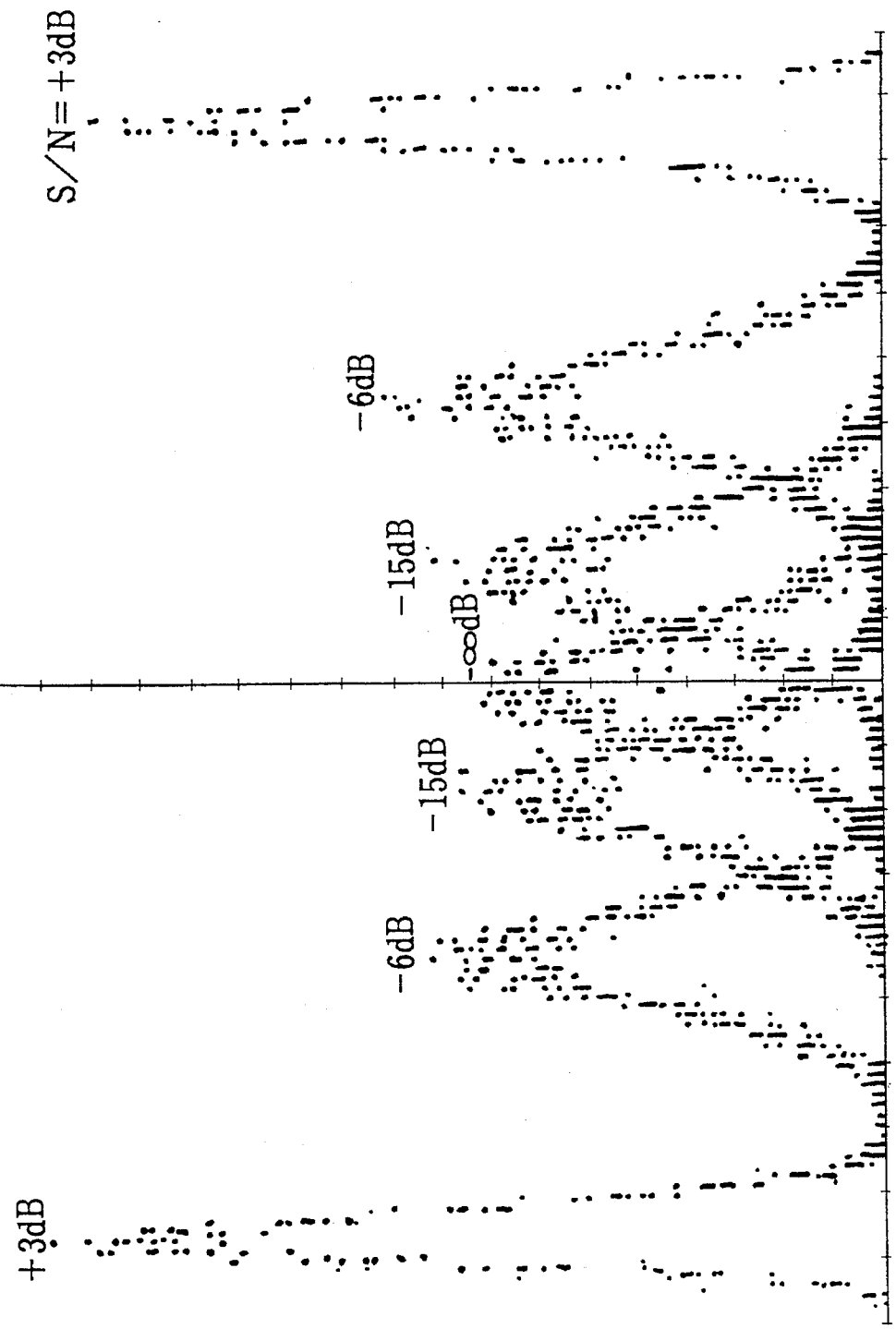
FIG. 14 is a probability distribution of an accumulated value k obtained by repeating an accumulation cycle involving Na=128 accumulation operations 2000 times.
Figure 15:
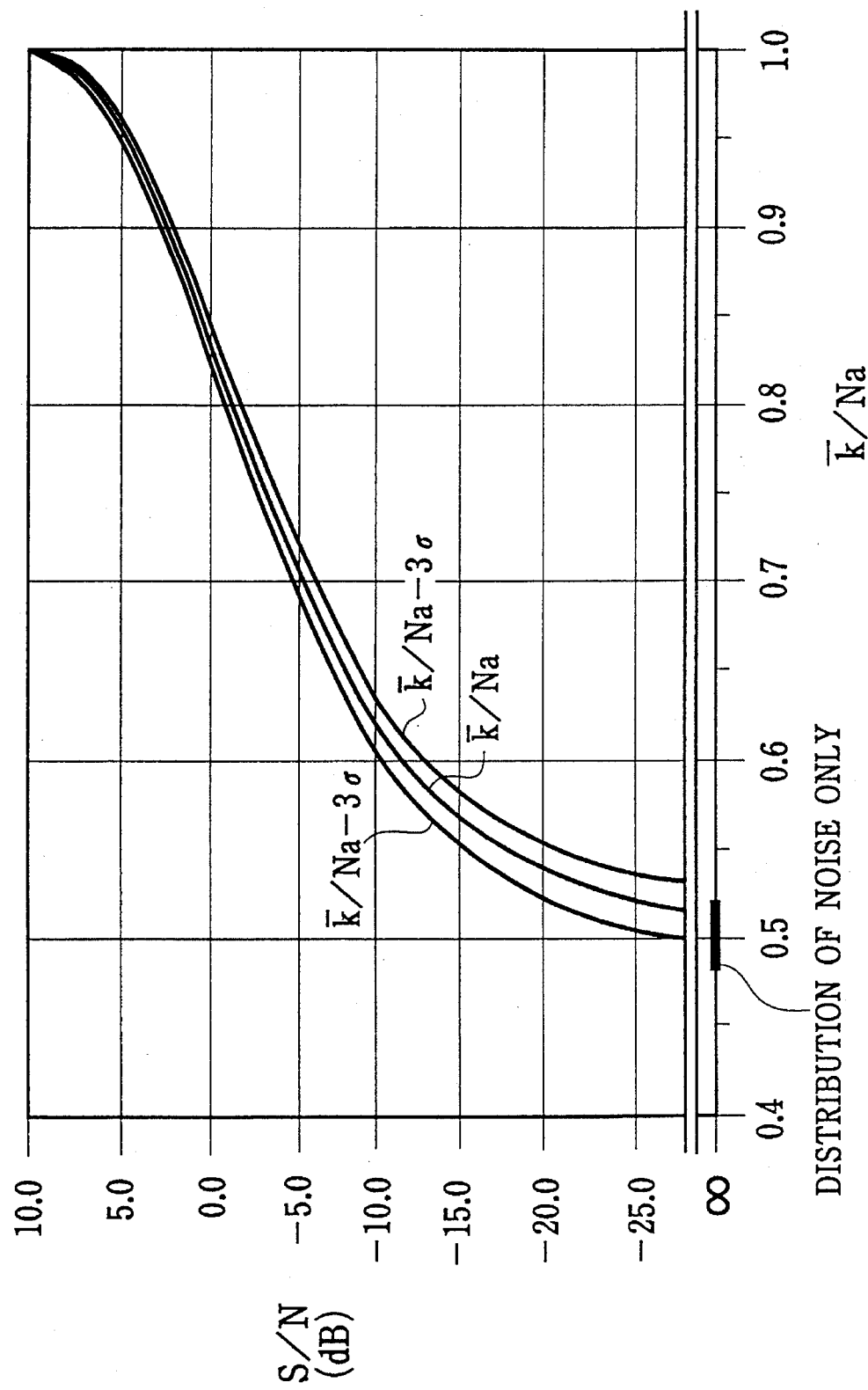
FIG. 15 shows a distribution of a normalized accumulated value k with Na=8192 in the range of an expected value of $\overline{K}$/Na to 3σ.
Figure 19:
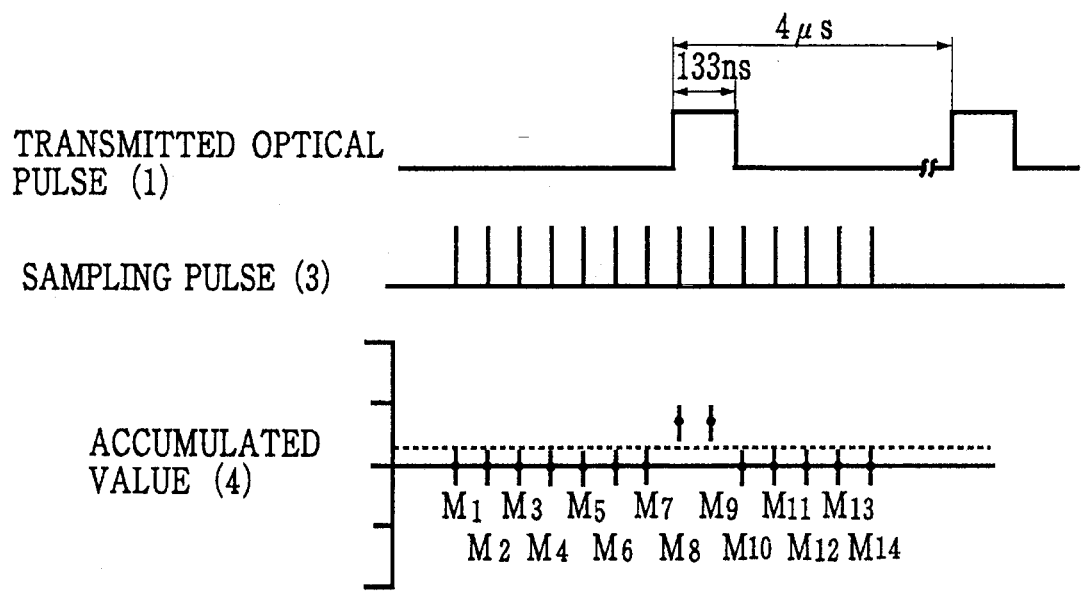
FIGS. 19, 20, and 21 explain an interference wave process according to the second embodiment.

FIG. 14 shows a probability distribution of an accumulated value k for S/N ratios of +3, −6, −15, and −∞ (noise only) dB. For each of the S/N ratios, the number N of accumulation operations is 128, which is repeated 2000 times. The right half of the figure for k/N of 0.5 to 1.0 corresponds to a positive signal phase, and the left half thereof for k/N of 0.0 to 0.5 corresponds to a negative signal phase. The measurement result for S/N=−∞ dB of FIG. 14 agrees with a result of calculation (N=128) of FIG. 4. The conventional radar apparatus needs an S/N ratio of 15.6 dB for discriminating a signal from noise at an accuracy of 99.865%. On the other hand, this embodiment greatly improves the S/N ratio by accumulating sampled phases 128 times, so that a signal of about −6 dB is discriminable. A duration for discriminating the signal is four microseconds× 128=512 microseconds with a pulse repetition period of four microseconds as shown in FIG. 19. This duration is very short. FIG. 15 shows a result of calculation of a normalized k in the range of an expected value $\bar{k}/Na$ and 3σ with N=8192. As the N increases, the width of a probability distribution narrows in proportion to $(N)^{1/2}$. A necessary accumulation period is four microseconds×8192=32 milliseconds, which is sufficiently short as a car distance measuring period in a car radar apparatus. In FIG. 15, it has been experimentally verified similar to the case of FIG. 14 that a signal of less than −20 dB is discriminable from noise. The embodiment simply samples the phases of a received signal and carries out accumulation operations, to greatly improve the S/N ratio. The circuits for carrying out the accumulation operations are standard logic circuits, so that the sampling, accumulation, and storage steps are carried out at high speed as and when required. This results in accumulating many data in a given period, to improve the S/N ratio. The logic circuits may be an array of gates formed on an IC chip to realize high speed and low noise operation. Similarly, the photosensor which may be a PIN photodiode or a phototransistor, the limiter amplifier, and the zero-cross comparator may be fabricated on a single chip or on a hybrid IC, to provide a low-noise, compact, light-weighted, reliable radar apparatus.

This embodiment considers only the positive and negative phases of a reflected signal, to quickly convert the signal into a binary signal, sample the phases thereof, and store them. Accordingly, the embodiment is capable of carrying out many accumulation operations to speedily detect a weak reflected signal based on a low-power transmission signal. The embodiment realizes high sensitivity in detecting a reflected signal. The radar apparatus according to this embodiment is simple and compact and secures a required measuring range. The embodiment employs a low-power light emitter, a radio transmitter, or an ultrasonic wave transmitter, as the pulse signal transmitter. Such transmitter is reliable, has a long service life, and is safe to the human body. This embodiment employs memories to carry out the accumulation operations. It is possible to arrange a counter for counting each bit of the sampling shift register, so that the counter is incremented according to whether or not the corresponding bit is H or L after each sampling operation. The embodiment adds up one in response to a sampling result of H and adds nothing in response to a sampling result of L. Instead, one may be added in response to a sampling result of H, and one may be subtracted in response to a sampling result of L. In this case, a result of the addition and substraction, i.e., a probability of occurrence of H and L is each 0.5 if there is only noise, to provide an average of zero. If the S/N ratio is sufficiently high, an average will be one.

Figure 16:
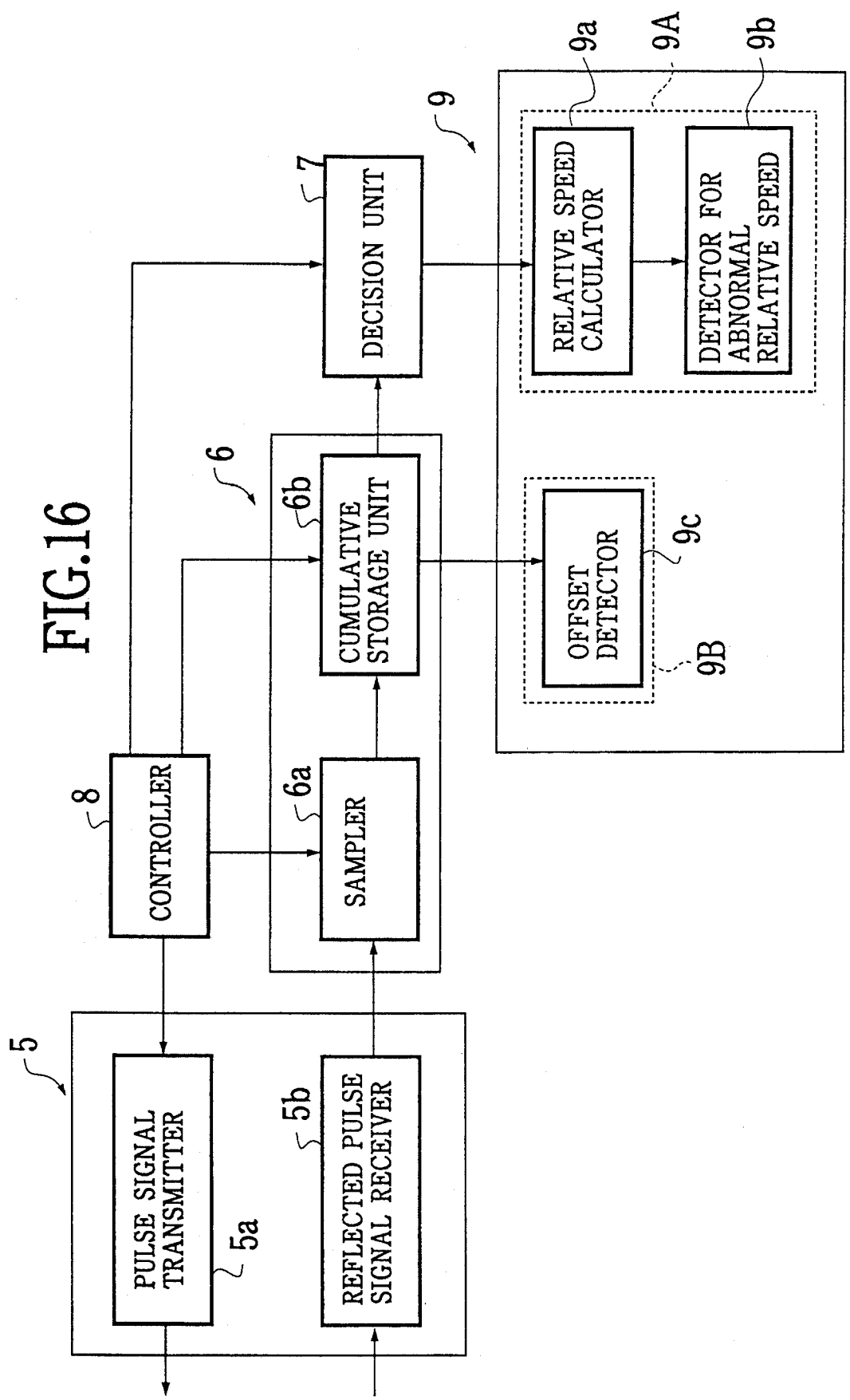
FIG. 16 is a block diagram showing a second embodiment of the present invention.
Figure 17:
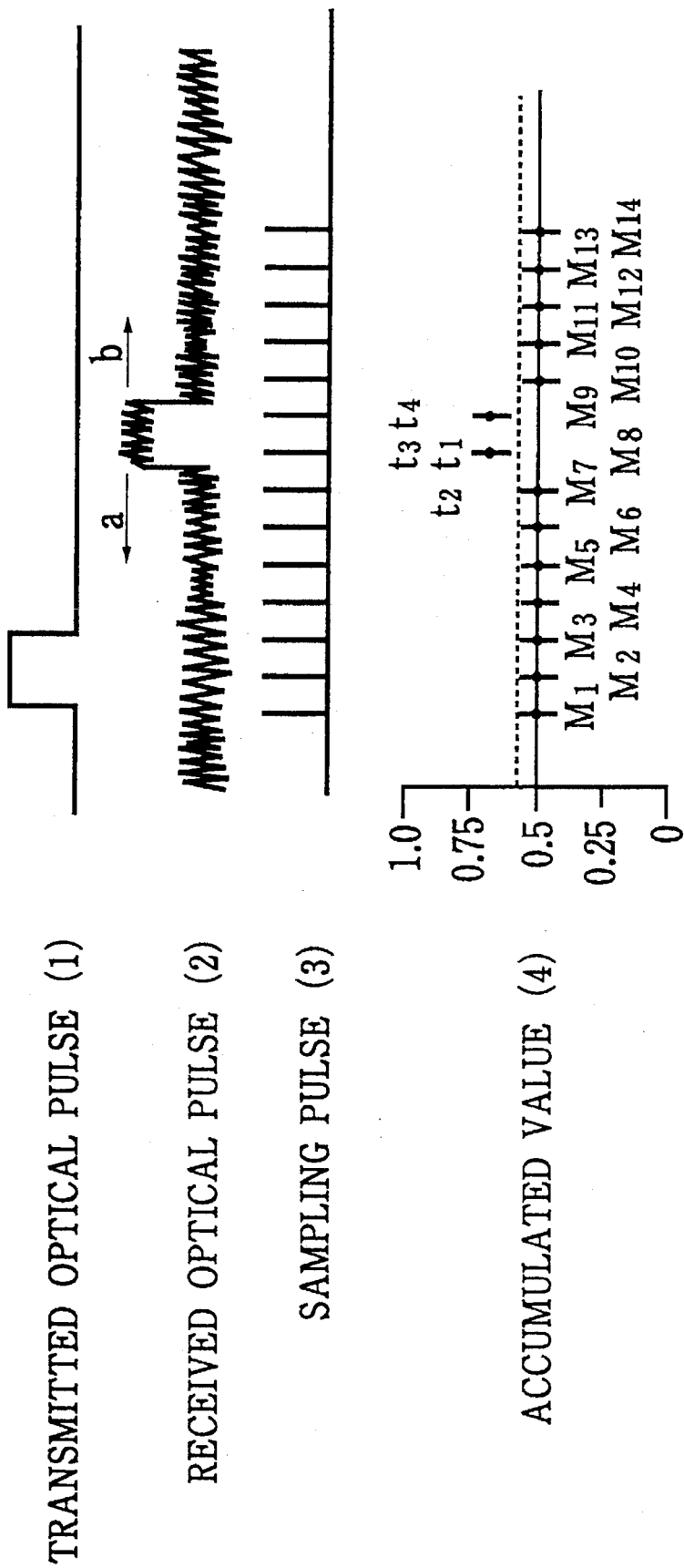
FIG. 17 explains the detection of a reflected pulse and the calculation of a relative speed according to the second embodiment.

The second embodiment of the present invention will be explained with reference to the drawings. FIG. 16 is a block diagram generally showing the second embodiment. The same parts as those of the first embodiment such as the radar head, operational storage unit, decision unit, and controller are represented with like reference marks, and their explanations will not be repeated. An interference detector 9 has a first interference detector 9A and a second interference detector 9B. The first detector 9A has a relative speed calculator 9a for calculating the relative speed of a target according to an elapsed time in detecting a reflected signal and an abnormal relative speed detector 9b for detecting an abnormality in a value calculated by the relative speed calculator 9a. The second detector 9B has an offset detector 9c for detecting an offset in accumulated data provided by an operational storage unit 6, to determine whether or not there is an interference signal. FIG. 17 explains a reflected wave detecting operation and a relative speed calculating operation carried out by the relative speed calculator 9a. An optical pulse signal (1) is transmitted and reflected by an external target. The reflected pulse is detected as an optical pulse signal (2) involving noise. The signal (2) is behind the transmission signal (1) by a predetermined period. Transmission of the signal (1) and detection of the signal (2) are carried out in synchronization with sampling pulses. Similar to the first embodiment, the sampling pulses (3) are generated at intervals of 66.7 nanoseconds corresponding to a distance of 10 meters. This example employs 14 sampling pulses to measure 130 meters. It is possible to employ other pulse intervals to measure other distances. Accumulated values (4) are stored in memories M1 to M14 corresponding to the sampling pulses, respectively. A distribution of the accumulated values has a width of $\Delta M$ corresponding to the number of accumulation operations. If an accumulated value (4) exceeds a threshold TH, a reflected pulse is detected, and if it is below the threshold TH, it is determined to be noise. Instead of the optical pulse signal (1), an ultrasonic pulse signal may be employed. In this case, the interval of pulses is determined according to a sonic velocity. The optical pulse signal is preferable because it allows smaller pulse intervals.

In FIG. 17, the signal (2) has pulses in the memories M8 and M9. The pulse in the proximal memory M8 is detected at time t1. When the target is approaching toward the radar apparatus, i.e., when a distance to the target is shortening, the received pulse (2) moves in the direction of an arrow mark a. The pulse in the memory M7 is detected at time t2. A difference between t1 and t2 corresponds to a distance narrowed by the target and a difference between the pulses detected in the M8 and M7. Namely, the difference corresponds to a period in which the sampling point of the received pulse (2) shifts one sampling interval, which corresponds to a distance of 10 meters. Accordingly, a relative approaching speed is obtained as 10/(t2-t1) m/s. When the target is separating from the radar apparatus, the received pulse (2) moves in the direction of an arrow mark b. At time t3, the accumulated value in the memory M8 becomes below the threshold TH, and the reflected pulse disappears. At time t4, the accumulated value in the memory M9 drops below the threshold TH, and the reflected pulse disappears. A difference between t4 and t3 corresponds to a distance to the target and a period in which the sampling point of the received pulse (2) moves the sampling interval, i.e., 10 meters. Accordingly, a relative separating speed is calculated as 10/(t4-t3) m/s. When the radar apparatus is approaching to or separating from the target at a speed of, for example, 100 Km/h, its relative speed is about 28 m/s. In this case, a time to move 10 meters is 10/28=0.36 seconds. A period for detecting a reflected pulse is 32 milliseconds with 8192 accumulation operations. This period is less than 1/10 of the moving speed. Accordingly, an error in calculating a relative speed due to the detection period is about ±1 m/s. If the relative speed is slower than 28 m/s, the time to move 10 meters becomes longer than 0.36 seconds, to further reduce the error.

Figure 18:
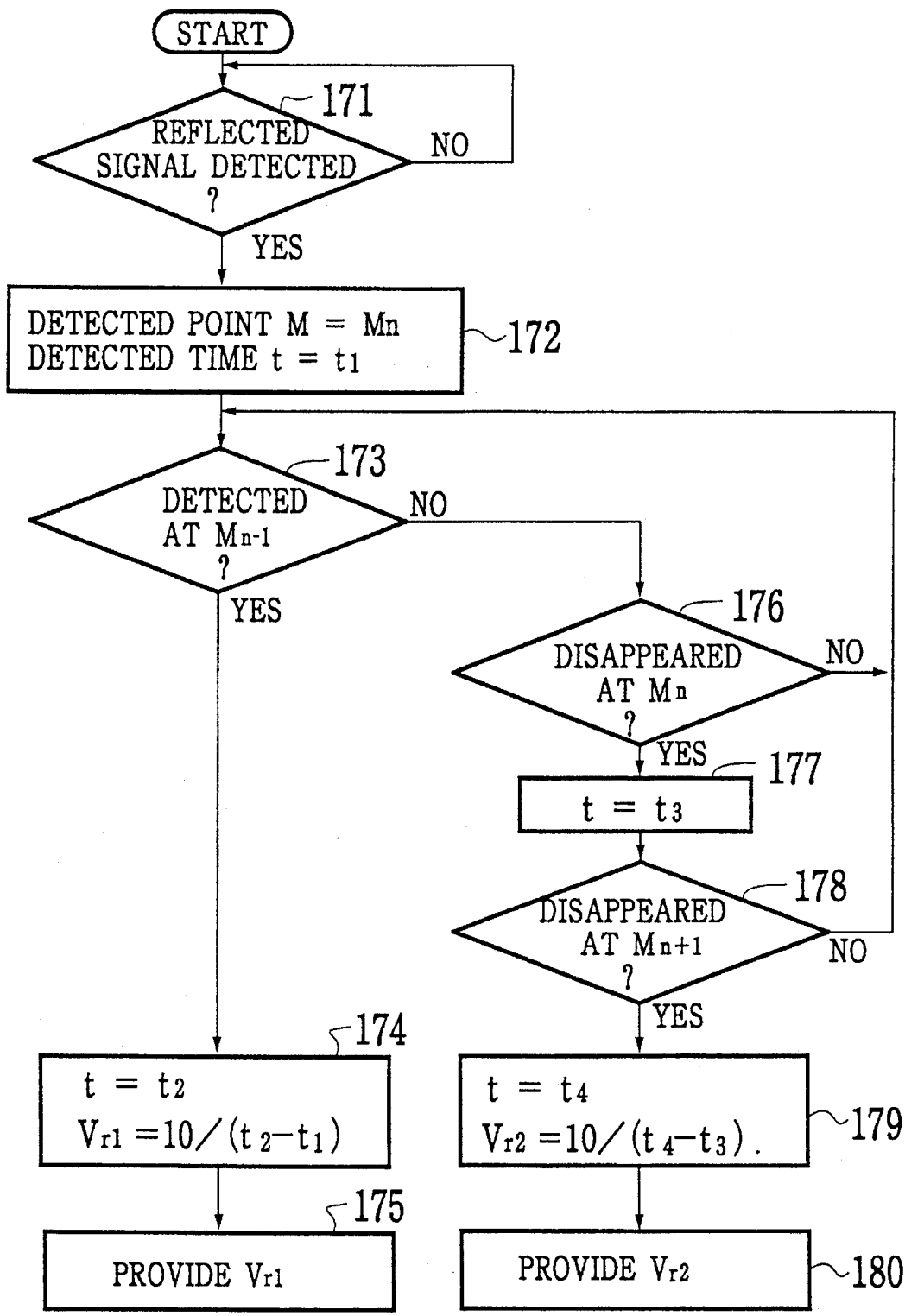
FIG. 18 is a flowchart showing steps of calculating a relative speed according to the second embodiment.

FIG. 18 is a flowchart showing steps of calculating a relative speed. Step 171 checks accumulated values in the memories M1 to Mn from the nearest one thereof, to see whether or not there is a reflected pulse therein. If YES, step 172 sets the memory in question as Mn and stores detection time t1. Step 173 determines whether or not a memory $Mn_{-1}$ in front of the memory Mn includes a reflected pulse. If YES, step 174 stores detection time t2 and divides 10 meters corresponding to the sampling interval by t2-t1 as follows:

$$Vr1=10/(t2-t1) \tag{10}$$

Step 175 provides the Vr1.

If the step 173 determines that the memory $Mn_{-1}$ contains no reflected pulse, step 176 determines whether or not the reflected pulse still exists in the memory Mn. If YES, the step 173 is repeated, and if NO, step 177 stores time t3 at which the reflected pulse has disappeared from the memory Mn. Step 178 determines whether or not the reflected pulse has disappeared from the memory $Mn+_1$. If the reflected pulse still exists in the memory $Mn+_1$, the step 173 is repeated, and if not, step 179 stores time t4 at which the reflected pulse has disappeared from the memory $Mn+_1$ and divides 10 meters corresponding to the sampling interval by t4-t3 as follows:

$$Vr2=10/(t4-t3) \tag{11}$$

Step 180 provides the Vr2.

In this way, the detection and disappearance of a reflected pulse are observed at the nearest sampling point. This may require the optical transmission pulse to sharply rise. It is not required, however, to shorten the width of the pulse. On the contrary, it is preferable to extend the pulse width longer than the sampling pulse interval of 66.7 nanoseconds. The probability of noise of exceeding the threshold TH is not always zero, and if it exceeds the threshold TH, it will cause erroneous detection. To prevent this, the width of the optical transmission pulse is extended so that a reflected pulse is simultaneously detected at two or more sampling points, which may be consecutive or not. This will reduce the probability of erroneous detecting noise as a reflected pulse. An embodiment employing an optical transmission pulse whose width covers two sampling points will be explained later with reference to the third embodiment of the present invention. Extending the width of a transmission pulse is equivalent to increasing the number of accumulation operations. Employing two accumulated values is equal to obtaining a margin of 3 dB in the S/N ratio if the threshold is unchanged. Namely, the technique of employing two accumulated values allows to lower the threshold, while securing the same erroneous detection probability achieved by detecting a reflected pulse at a single sampling point. The second embodiment thus improves detection sensitivity by 3 dB. This embodiment allows the optical transmission pulse to be wide and improves the S/N ratio. The second embodiment correctly calculates an approaching or separating speed even with coarse sampling intervals. The second embodiment relaxes pulse transmission conditions, to thereby make the transmitter and controller simplified, small-sized, and lightweighted.

Figure 20:
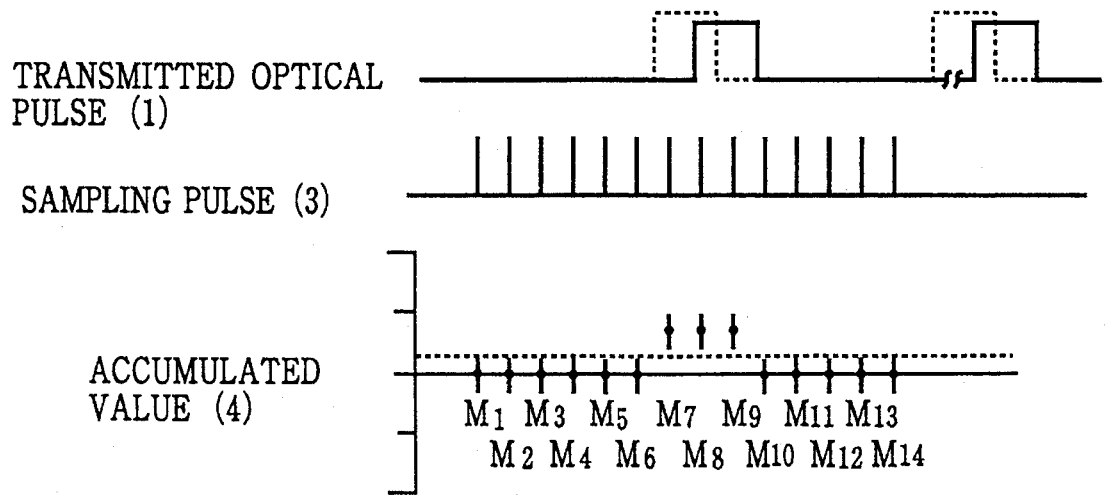
Figure 21:
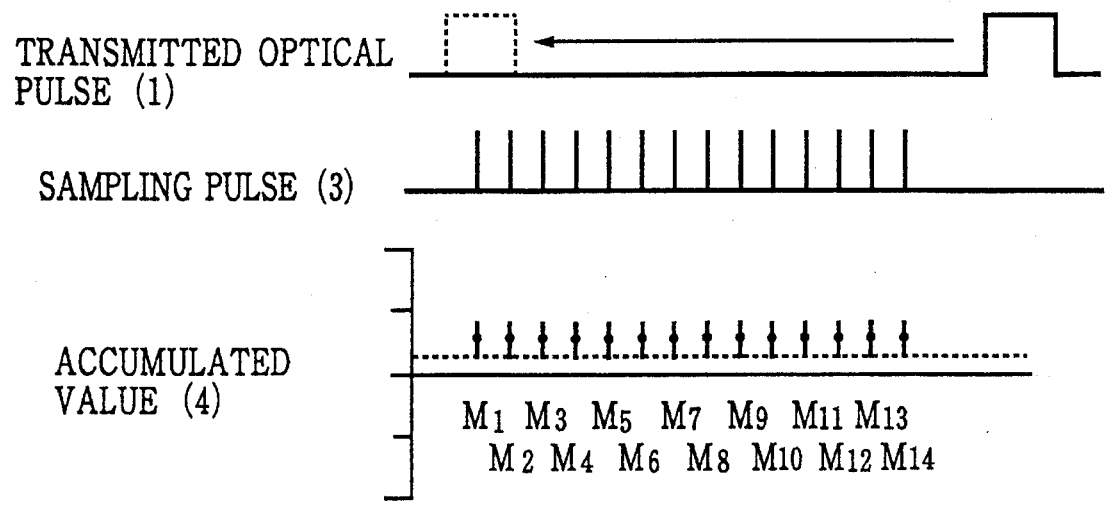

FIGS. 19 to 21 explains a technique of processing an interference signal caused by a pulse signal transmitted from a target. If a car equipped with a radar apparatus is stopped and if there is an opposite car stopped equipped with a like radar apparatus, the car will receive a pulse signal from the opposite car. In this case, the radar apparatus of the car will detect the opposite car, if the radar apparatuses of both the cars employ a reference clock signal of the same frequency fc and if the pulse signal from the opposite car reaches the car in question within a period set for distance measurement. The reference clock signal is usually generated by a crystal oscillator having a frequency error of $\Delta f$. This frequency error causes a synchronization error in a pulse signal, thereby influencing measurement and accumulation operations. When the ratio ($\Delta f/fc$) of the frequency error $\Delta f$ to the reference frequency fc is smaller than $2 \times 10^{-7}$ (FIG. 19), the frequency error will provide a relative speed of $2 \times 10^{-7} \times 3 \times 10^{8}$ (where $3 \times 10^{8}$ is the velocity of light). Accordingly, it is observed that the opposite car is moving at a speed of 60 m/s (216 Km/h). In this case, it is impossible to determine whether it is an error due to an interference with the pulse signal transmitted from the opposite car or the opposite car is actually moving at the observed speed. If this radar apparatus serves as a collision alarm device, it may provide a wrong alarm. When the ratio $\Delta f/fc$ further increases within an accumulation period of 32 milliseconds, to cover twice (133 nanoseconds) a sampling interval, i.e., $133\times10^{-9}/32\times10^{-3}=4.16\times10^{-6}$ due to the interference with the pulse signal from the opposite car, the situation worsens.

If the ratio $\Delta f/fc$ is greater than $2\times10^{-7}$ and smaller than $4.16\times10^{-6}$, it is observed that the opposite car is moving at a relative speed of 60 m/s (216 Km/h). This speed is abnormal as the speed of a standard car, so that it is determined to be erroneous detection due to the interference. If the ratio $\Delta f/fc$ is in this range, it is possible to identify the erroneous detection caused by the interference by monitoring a relative speed. Namely, the abnormal relative speed detector 9b provides an abnormality output if the relative speed is greater than 60 m/s. FIG. 20 explains the case of the ratio $\Delta f/fc$ being above $4.16\times10^{-6}$ and below the ratio of sampling interval to accumulation period (in the above case, four microseconds to 32 milliseconds $=1.25\times10^{-4}$ or below). As explained above, a sampling point moves for $4.16\times10^{-6}\times0.032=133$ nanoseconds or more within the accumulation period of 32 milliseconds due to the interference if the frequency error ratio exceeds $4.16\times10^{-6}$. Accordingly, if the appearance and disappearance of a reflected pulse are observed at the nearest sampling point as in the case of FIG. 18, it will be impossible to calculate the relative speed. Accordingly, it is determined that erroneous detection has occurred due to the interference. In this way, the alarming logic according to the second embodiment employs two parameters, i.e., a distance and a relative speed, to surely identify erroneous detection due to an interference and issue no wrong alarm. In this range of frequency error ratio, a received pulse is observed over three sampling points or more which are at time intervals of 66.7 nanoseconds. When the frequency error ratio further increases, the interference gradually covers all sampling points. If the frequency error ratio $\Delta f/fc$ is equal to the ratio of sampling interval to accumulation period, i.e., $1.25\times10^{-4}$ and is in synchronization with the interference at the start of accumulation operations, the sampling point where a reflected pulse is detected moves for $1.25\times10^{-4}\times0.032=4$ microseconds, which is equal to the pulse signal transmission interval, after 32 milliseconds in which 8192 accumulation operations are completed. Accordingly, erroneous detection due to the interference is always observed at every sampling point at a time ratio of 133 nanoseconds/4 microseconds=3.334 with respect to a pulse width of 133 nanoseconds. If the S/N ratio of the interference is sufficiently high, an offset of $8192\times0.033=273$ due to the interference occurs on the 8192 accumulation operations. The threshold TH for detecting a pulse in the 8192 accumulation operations is about 0.5 (an average of noise) plus 0.02 in terms of a normalized accumulated value. Accordingly, the offset is greater than the threshold, i.e., $8192\times0.02=163$. If it is set to cause a uniform offset at every sampling point when a target causes an interference, it is possible to identify the interference by monitoring accumulated data to see whether or not the uniform offset has occurred. When the frequency error ratio $\Delta f/fc$ is below $1.25\times10^{-4}$, the offset will occur irregularly. If there are a plurality of targets with the frequency error ratio $\Delta f/fc$ of below $1.25\times10^{-4}$, a pulse will be observed over more than three sampling points, so that it is impossible to correctly identify the interference from the offset on accumulated values. If the frequency error ratio $\Delta f/fc$ is set to be greater than the ratio of sampling interval to accumulation period ($1.25\times10^{-4}$) (FIG. 21), the uniform offset will be always observed on accumulated data. In this case, the interference is identifiable according to an output of the offset detector 9c. At the same time, the threshold TH is set according to a proper offset value, and if an actual reflected pulse from a target exceeds the threshold TH, the pulse will be detected. Accordingly, a distance to the target is correctly measurable even with the interference with the target. Alternatively, the offset due to the interference may be removed by a proper removing device, to detect a true reflected pulse.

As explained above, the interference signal is detectable and removable by monitoring a relative speed and an offset in accumulated data and by removing the offset. To detect the interference with a target, the frequency error ratio $\Delta f/fc$ must be greater than $2\times10^{-7}$ so that the abnormal relative speed detector 9b may detect the interference. This prevents the collision alarm device from providing a wrong alarm. The offset is detectable dependent on the frequency error ratio. To surely detect the interference, the frequency error ratio $\Delta f/fc$ must be greater than the ratio of sampling interval to accumulation period ($1.25\times10^{-4}$). This results in dispersing the interference over all sampling points, so that the interference is removed and a reflected pulse from a target is detected. Namely, a reflected pulse greater than the offset is detectable. When the offset is 0.0333, the threshold TH is calculated as 0.5533 by adding an average of 0.5 for noise plus a threshold of 0.02 for noninterference signal to the threshold TH. This enables the radar apparatus to detect a signal up to −17 dB. This corresponds to a sensitivity loss of 3 dB compared with a signal detection level of −20 dB with no interference. Due to the sensitivity loss of 3 dB, a measuring distance will be shortened 0.91 times, or 0.84 times if the sensitivity loss is 6 dB. This results, however, in minimizing or removing interference signals. As explained above, the frequency error ratio $\Delta f/fc$ of a reference clock signal is set to disperse an interference signal from a target over all sampling points, thereby removing the interference signal.

This embodiment detects an interference signal from a target according to a relative speed and data accumulated in memories and removes the interference signal. The embodiment properly selects the frequency of the reference clock signal and the frequency error ratio $\Delta f/fc$ thereof, to minimize the influence of the interference signal. The embodiment thus minimizes or removes erroneous detection due to the interference signal. The embodiment realizes a reliable car distance alarm device and a collision alarm device, to secure safety driving. A 15-MHz reference clock frequency fc has a period of 66.7 nanoseconds that correspond to a distance of 10 meters in the radar apparatus If a measurement error of 1%, i.e., one meter per 100 meters is allowable, the frequency error ratio $\Delta f/fc$ must be $10^{-2}$ or below, i.e., the frequency must be in the range of 14.85 to 15.15 MHz. To secure the frequency error ratio $\Delta f/fc$ equal to the ratio of sampling interval to accumulation period, i.e., $1.25\times10^{-4}$ or over, the frequency must be distributed such that a space of 300 KHz between 14.85 MHz and 15.15 MHz is filled with 160 pulses at intervals of $15\times10^{6}\times1.25\times10^{-4}=1875$ Hz. The reference clock frequency fc is not necessarily of 15 MHz. Many frequency distributions are possible. When the frequency error ratio $\Delta f/fc$ exceeds the ratio of sampling interval to accumulation period, an interference signal from an opposite car is detectable as a uniform offset value with no regard to an abnormal relative speed. Accordingly, if a relative speed of 216 Km/h or higher actually occurs, an abnormal speed alarm will be issued to warn that the cars are approaching each other at a speed of 120 Km/h or over.

Figure 22:
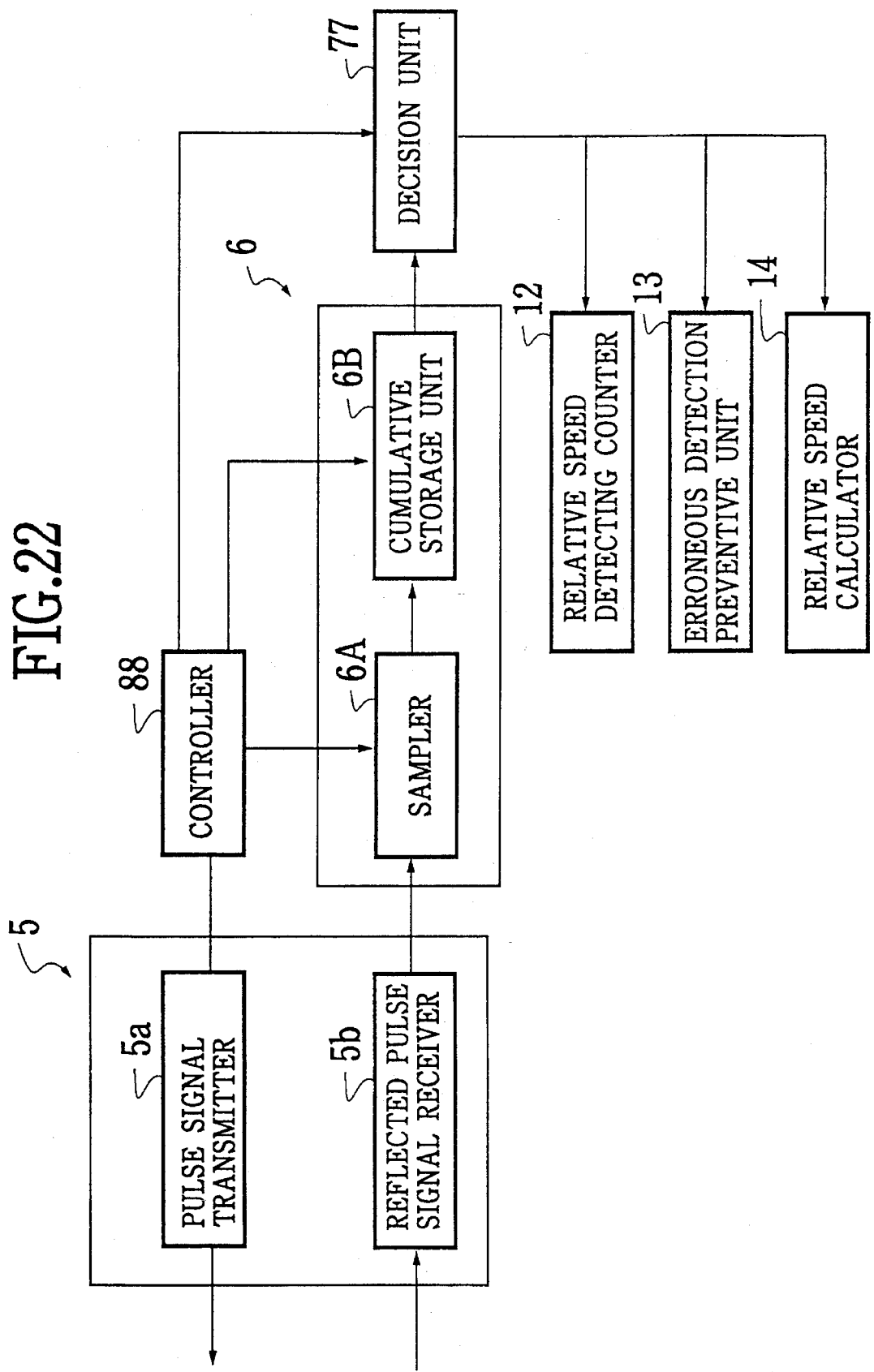
FIG. 22 is a block diagram showing a modification of the second embodiment.

The third embodiment of the present invention will be explained. The third embodiment is a modification of the second embodiment. FIG. 22 is a block diagram showing the third embodiment. The same parts as those of the first embodiment such as the radar head and cumulative storage unit are represented with like reference marks, and their explanations will not be repeated. A decision unit 77 is basically the same as the decision unit 7 of the first embodiment. The decision unit 77 has a function of determining whether or not the detection point of a reflected signal from a target has moved, i.e., whether or not the relative speed of the target has changed. The decision unit 77 controls a relative speed detection counter 12, an error detection preventive unit 13, and a relative speed calculator 14. A controller 88 is basically the same as the controller 8 of the first embodiment and provides a trigger pulse to a driver 5a-1 of a pulse signal transmitter 5a. According to this embodiment, the transmitter 5a transmits an optical pulse signal whose width covers at least two consecutive sampling points. The counter 12 counts the number of trigger pulses provided by a trigger pulse generator 8c and informs the decision unit 77 or relative speed calculator 14 of the count. The counter 12 is cleared after the relative speed calculator 14 calculates the relative speed of the target. The error detection preventive unit 13 is set by the controller 88 and confirms whether or not a reflected pulse is detected over at least two consecutive sampling points in a sampling period. When the reflected pulse is not detected over at least two sampling points, it is determined to be noise. The relative speed calculator 14 multiplies the number of the trigger pulses by the interval of the trigger pulses, i.e., four microseconds and divides a distance corresponding to one sampling interval (10 meters in this embodiment similar to the first embodiment) by the result of the multiplication, to provide a relative speed, i.e., the approaching or separating speed of the target. According to the third embodiment, when an optical pulse is transmitted, a reflected optical pulse is received after a given time needed for the transmitted pulse being reflected by the target and reaching the radar apparatus. The transmission and reception of the pulse are carried out in response to the sampling pulses. The sampling pulses are generated at intervals of, for example, 66.7 nanoseconds corresponding to a distance of 10 meters. This embodiment employs 14 sampling pulses to measure 130 meters. Sampled data are accumulated in memories M1 to M14 corresponding to the sampling pulses, respectively. The accumulated data show a distribution width of ΔM depending on the number of accumulation operations. When accumulated values at optional two consecutive sampling points exceed each a threshold TH, a reflected pulse is detected. If the accumulated value is below the threshold TH, it is determined to be noise.

A method of calculating a relative speed according to the third embodiment will be explained. When a reflected pulse from a target is detected, the sampling point of the reflected pulse is set as a reference, and a period in which the sampling point moves in a forward direction (the direction of the arrow mark a in the first embodiment of FIG. 17) or in a backward direction (in the direction of the arrow mark b in FIG. 17) by one position is counted. According to the counted period, the relative speed of the target is calculated. If the target is approaching toward the radar apparatus, the reflected pulse is detected in a shorter time. Accordingly, the sampling point of the reflected pulse moves forward by one. During this period, the number of trigger pulses T is counted, and the count k is multiplied by the interval (four microseconds) of the trigger pulses T. The multiplication result corresponds to a period in which the received pulse moves for the sampling interval (10 meters). Accordingly, the relative approaching speed is obtained as 10/(k·T). When the target is separating from the radar apparatus, the period between the transmission and reception of a pulse becomes longer, so that the sampling point of the reflected pulse moves backward by one. The number of trigger pulses T is counted, and the count k of the trigger pulses is multiplied by the interval of the trigger pulses T, i.e., four microseconds. A result of the multiplication corresponds to a period in which the received pulse moves for the sampling interval (10 meters). Accordingly, the separating speed is calculated as 10/(k·T).

Figure 23A:
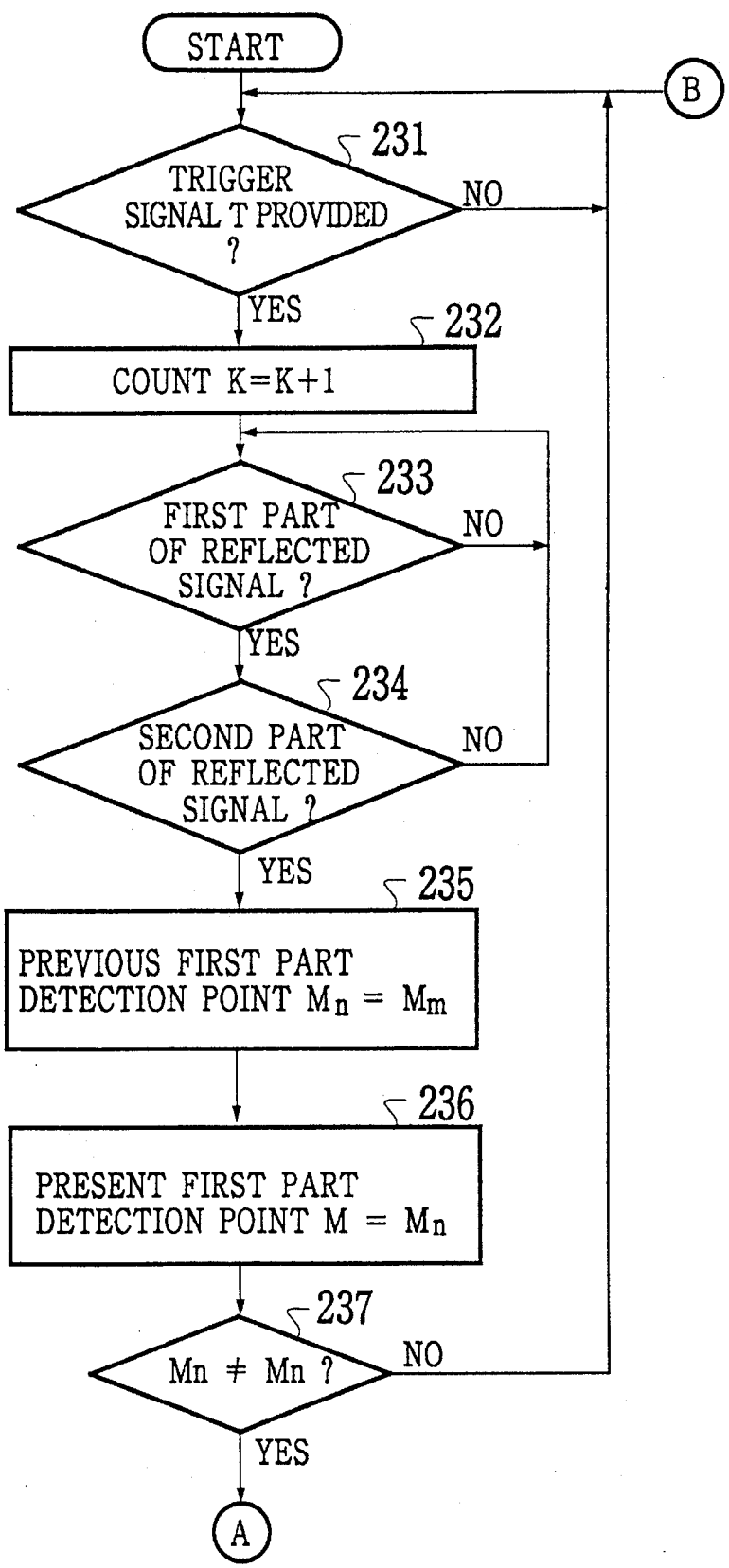
FIG. 23A and 23B is a flowchart showing steps carried out by the modification of the second embodiment.
Figure 23B:
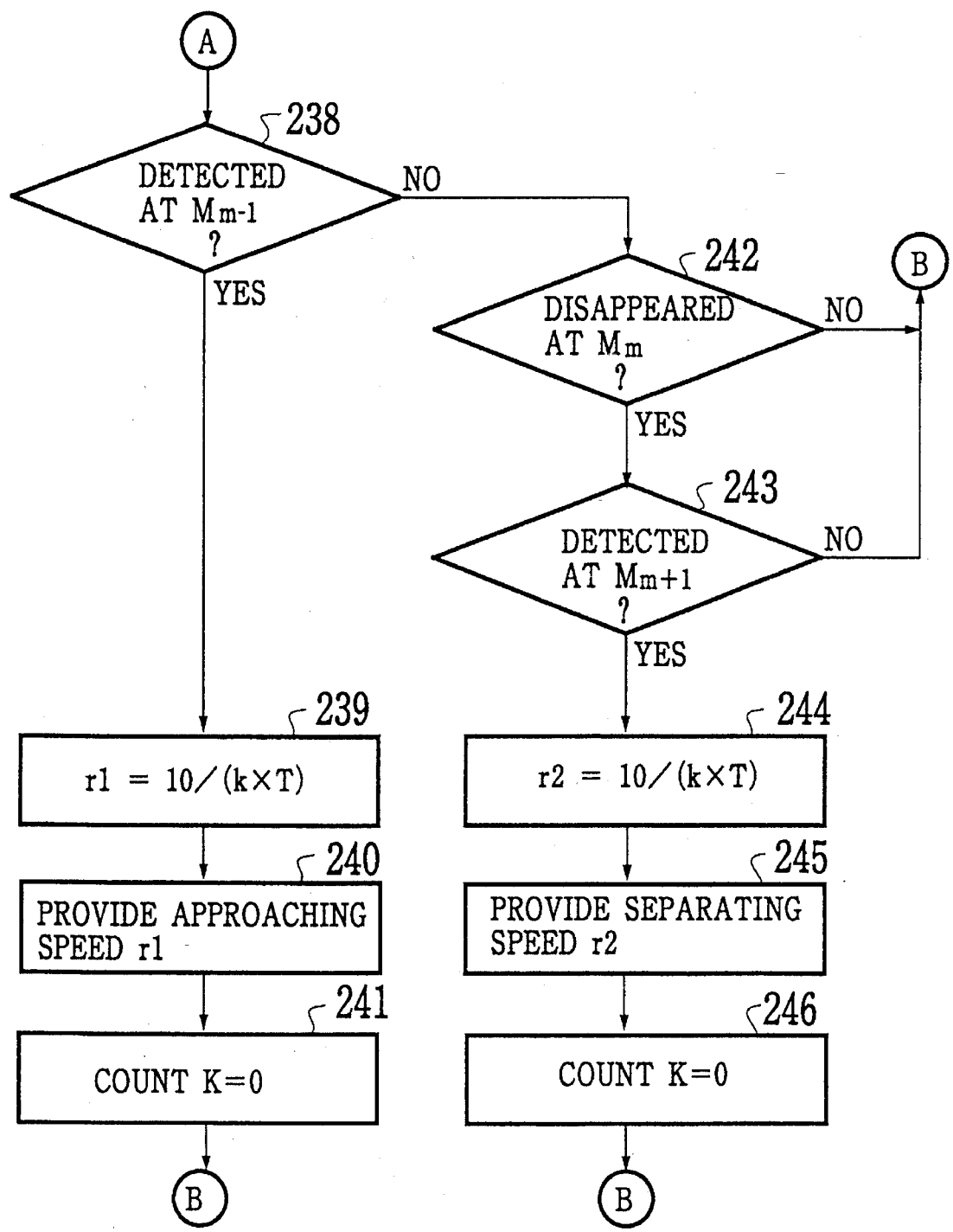

FIG. 23 is a flowchart showing steps carried out by the third embodiment of the present invention. Step 231 determines whether or not a trigger pulse T has been provided. If YES, step 232 increments the counter 12, and step 233 determines whether or not a first part of a reflected pulse has been detected. According to this embodiment, the width of the pulse from the transmitter 5a extends over two sampling points. Accordingly, the first part of the reflected pulse is firstly detected in response to a sampling pulse. If the first part has been detected, step 234 determines whether or not a second part of the pulse has been detected. The reason why the second part of the pulse is detected is because, as explained above, a true reflected pulse extends over at least two sampling pulses. This may prevent erroneous detection. If the step 234 determines that there is no second part, the step 233 is repeated. If the second part is detected, it is determined that the detected pulse is a true reflected pulse, and step 235 changes a sampling point where the first part of the previous reflected pulse has been detected from Mn to Mm. Step 236 changes a sampling point where the first part of the present reflected pulse has been detected from M to Mn. Step 237 determines whether or not the sampling points Mn and Mm are equal to each other. If YES, it is determined that the relative speed of the target is substantially zero, and the step 231 is repeated. If the Mn and Mm are not equal to each other, it is determined that the relative speed of the target is changing, i.e., the target is approaching or separating. Step 238 determines whether or not the first part of the present reflected pulse has been detected at a sampling point Mm−1. If NO, step 242 is carried out, and if YES, it is determined that there is an approaching speed, and step 239 calculates the approaching speed Vr1 as follows:

$$Vr1 = 10/(t \cdot T) \tag{12}$$

where t is a count counted by the counter 12 and T is the interval (four microseconds) of the trigger pulses. Step 240 provides the approaching speed Vr1. Step 241 clears the counter 12, and the step 231 is repeated. If the step 238 determines that the first part of the present reflected pulse has not been detected at the sampling point Mm−1, the step 242 determines whether or not the first part of the present reflected pulse has disappeared at the sampling point Mm. If NO, the step 231 is repeated, and if YES, step 243 determines whether or not the first part of the present reflected pulse has been detected at a sampling point Mm+1. If NO, the step 231 is repeated, and if YES, it is determined that there is a separating speed, and step 244 calculates the separating speed Vr2 as follows:

$$Vr2 = 10/(t \cdot d) \tag{13}$$

where t is a count counted by the counter 12 and T is the interval (four microseconds) of the trigger pulses. Step 245 provides the separating speed Vr2. Step 246 clears the counter 12, and the flow returns to the step 231.

In this way, this embodiment sets a sampling point where a reflected pulse is newly detected as a reference point.

According to the reference point, the embodiment counts a shift of the reflected pulse on sampling points, to calculate a relative speed. This may require the transmission pulse to steeply rise. It is not necessary, however, to shorten the width of the pulse. It is rather preferable to extend the pulse width longer than the interval of the sampling pulses. In this example, the probability of a signal caused only by noise exceeding the threshold TH for detecting a reflected pulse is not zero. Namely, there is a possibility of erroneous detection. Such erroneous detection due to noise will be reduced by always checking whether or not a reflected pulse is detected at consecutive two sampling points. This technique is equivalent to further accumulating data. Under the same threshold TH, the technique of employing two accumulated values is equivalent to obtaining a margin of 3 dB. In other words, the threshold TH may be decreased to obtain the same error detection probability provided by detecting a reflected pulse at one sampling point. Namely, detection sensitivity is improved by 3 dB. The third embodiment employs the sampling points as distance gates and calculates a relative speed according to an interval between the sampling points where reflected pulses are detected or an interval between the sampling points where a reflected pulse appears and disappears. This interval is counted according to the trigger pulses and corresponds to a predetermined distance. Even if the width of the transmission pulse is wide and the sampling interval is coarse, the relative speed is correctly and speedily calculable. This embodiment widens the transmission pulse width longer than the sampling interval so that a reflected pulse is detected at two sampling points or more, to reduce the probability of erroneous detection and improve pulse detection sensitivity. It is possible that noise exceeds the threshold just before a reflected pulse covering two sampling points is detected. In this case, the step 233 detects the noise, the step 234 detects a first part of a true reflected pulse and then a second part of the reflected pulse. In this case, the embodiment will provide an approaching speed even if the actual relative speed is zero. To prevent this, there is inserted a step of postponing the relative speed calculation if a reflected pulse is detected at consecutive three or more sampling points. In this case, the erroneous detection will be avoided only with an additional delay time corresponding to one trigger pulse. If noise is detected at consecutive two or more sampling points, erroneous detection will be avoided by considering a nonexistent distance. This embodiment employs a simple arrangement to effectively prevent erroneous detection, correctly measure a distance, and calculate a relative speed.

Figure 24:
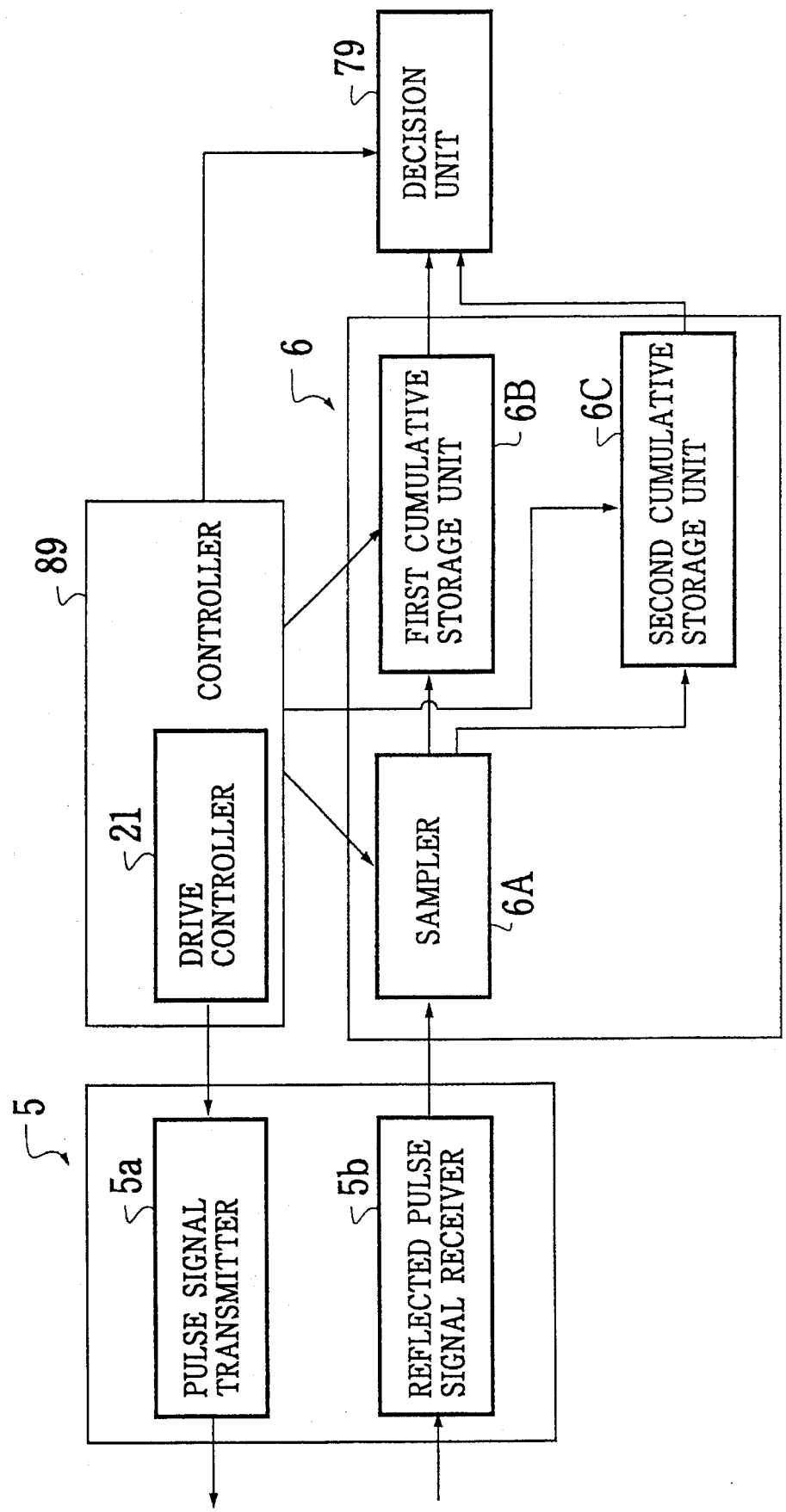
FIG. 24 is a block diagram showing a third embodiment of the present invention.

The fourth embodiment of the present invention will be explained with reference to the drawings. FIG. 24 is a block diagram showing the fourth embodiment. In the figure, the same parts as those of the first embodiment such as the radar head and sampler are represented with like reference marks, and their explanations will not be repeated. A pulse signal transmitter 5a transmits a pulse signal, which is sampled by a sampler 6A. A first cumulative storage unit 6B sequentially accumulates data sampled by the sampler 6A. The first cumulative storage unit 6B is the same as that of the first embodiment. While the transmitter 5a is inactive, the sampler 6A samples data, which are sequentially accumulated in a second cumulative storage unit 6C. Namely, the second cumulative storage unit 6C accumulates only noise data. In response to an instruction from a controller 89, a decision unit 79 fetches data from the first cumulative storage unit 6B and determines whether or not the data contain a reflected pulse from a target, similar to the first embodiment. The decision unit 79 has a function of calculating the relative speed of the target, similar to the second embodiment. In response to an instruction from the controller 89, the decision unit 79 fetches data from the second cumulative storage unit 6C, detects a noise level at each sampling point in one sampling period, and uses the noise levels as thresholds for detecting the reflected pulse from the target. The controller 89 controls the radar head 5, sampler 6A, first cumulative storage unit 6B, and decision unit 79, to detect the reflected pulse from the target and calculate the relative speed of the target, similar to the first embodiment. The controller 89 also controls second cumulative storage unit 6C, and a drive controller 21, to detect the noise level of each sampling point in one sampling period. The drive controller 21 has a function of instructing the sampler 6A to sample noise, a function of counting the number (for example, 8192) of noise level detecting operations carried out after sampling a reflected signal, and a function of terminating the noise level detecting operations according to the count. It is possible to provide a function of stopping the transmitter 5a once the number of trigger pulses provided by a trigger generator 8C reaches a predetermined value.

Figure 25B:
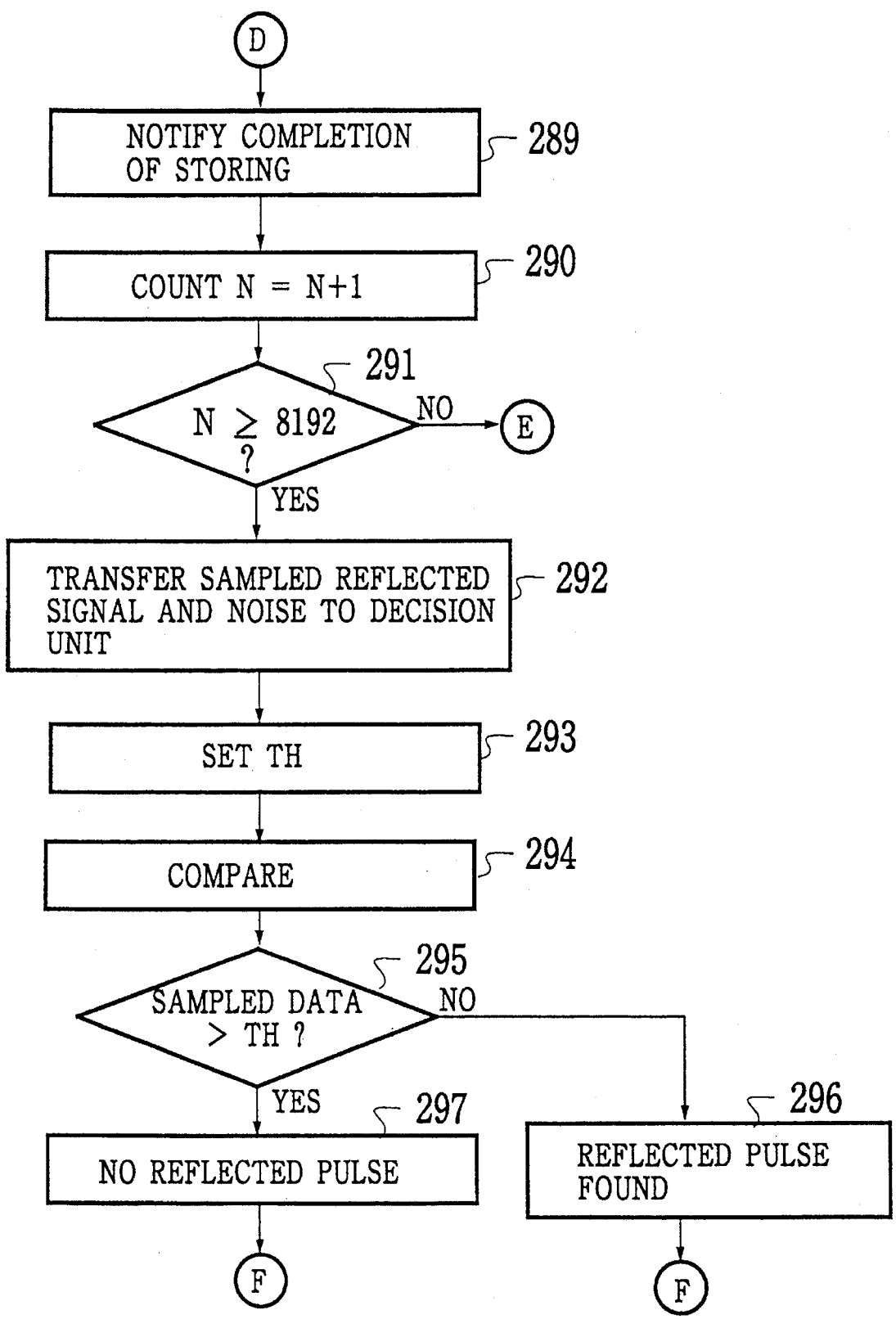

FIG. 25 is a flowchart showing steps carried out according to the fourth embodiment. Step 281 resets the counter N=0. Step 282 instructs the transmitter 5a to transmit a pulse signal. Step 283 samples a reflected signal from a target. Step 284 transfers sampled data to the first cumulative storage unit 6B, which accumulates the data. Step 285 informs the decision unit 79 of the completion of the storage of the data. Step 286 instructs to sample noise. Step 287 samples noise. Step 288 transfers the sampled noise data to the second cumulative storage unit 6C, which accumulates the data. Step 289 informs the decision unit 79 of the completion of the storage of the noise data. Step 290 increments the counter N=N+1. Step 291 determines if N≧8192. If N<8192, the flow returns to the step 282. If N≧8192, step 292 transfers the sampled signal and noise data to the decision unit 79. Step 293 recognizes a noise level at each sampling point according to the noise data and sets, for the corresponding sampling point, a threshold TH for detecting a reflected pulse signal. Namely, each noise level is set as a threshold TH. Step 294 compares the noise levels with the sampled reflected signal. Step 295 determines whether or not there is a reflected pulse that is greater than the thresholds. If NO, step 296 determines that there is no reflected pulse from the target, and the flow returns to the step 281. If there is the reflected pulse greater than the thresholds, step 297 determines that the reflected pulse from the target has been detected, and the flow returns to the step 281. If the reflected pulse from the target is detected, a distance to the target and the relative speed of the target are calculated according to the detected pulse, and calculated results and an alarm if necessary are displayed on a CRT.

Figure 26:
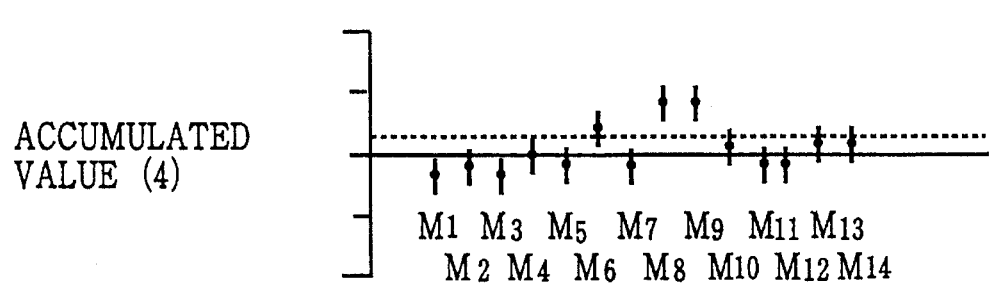
FIG. 26 shows thresholds based on noise levels according to the third embodiment.

In FIG. 26, noise detected in the memory M6 is higher than a threshold TH, which is set according to the first or second embodiment. The fourth embodiment sets this noise as a threshold for detecting a reflected pulse from a target, to avoid erroneous detection due to the noise. The fourth embodiment samples noise just after sampling a reflected signal from a target. This is to sample environmental noise due to sunlight, temperature, humidity, engine, alternator, fluctuations in a power source voltage, etc. The fourth embodiment samples only noise just after sampling a reflected signal from a target. The present invention is not limited to this. For example, noise may be sampled after transmitting a plurality of pulses, or noise may be sampled s times after transmitting k pulses. The second cumulative storage unit 6C may be omitted, and the first cumulative storage unit 6B may alternately detect a reflected signal and noise. The fourth embodiment of the present invention employs a simple arrangement to prevent erroneous detection due to noise, accurately measure a distance, and correctly calculate a relative speed. It is possible to control the controller 89 or drive controller 21 according to external signals, to optionally set the sampling timing of noise.

Figure 27:
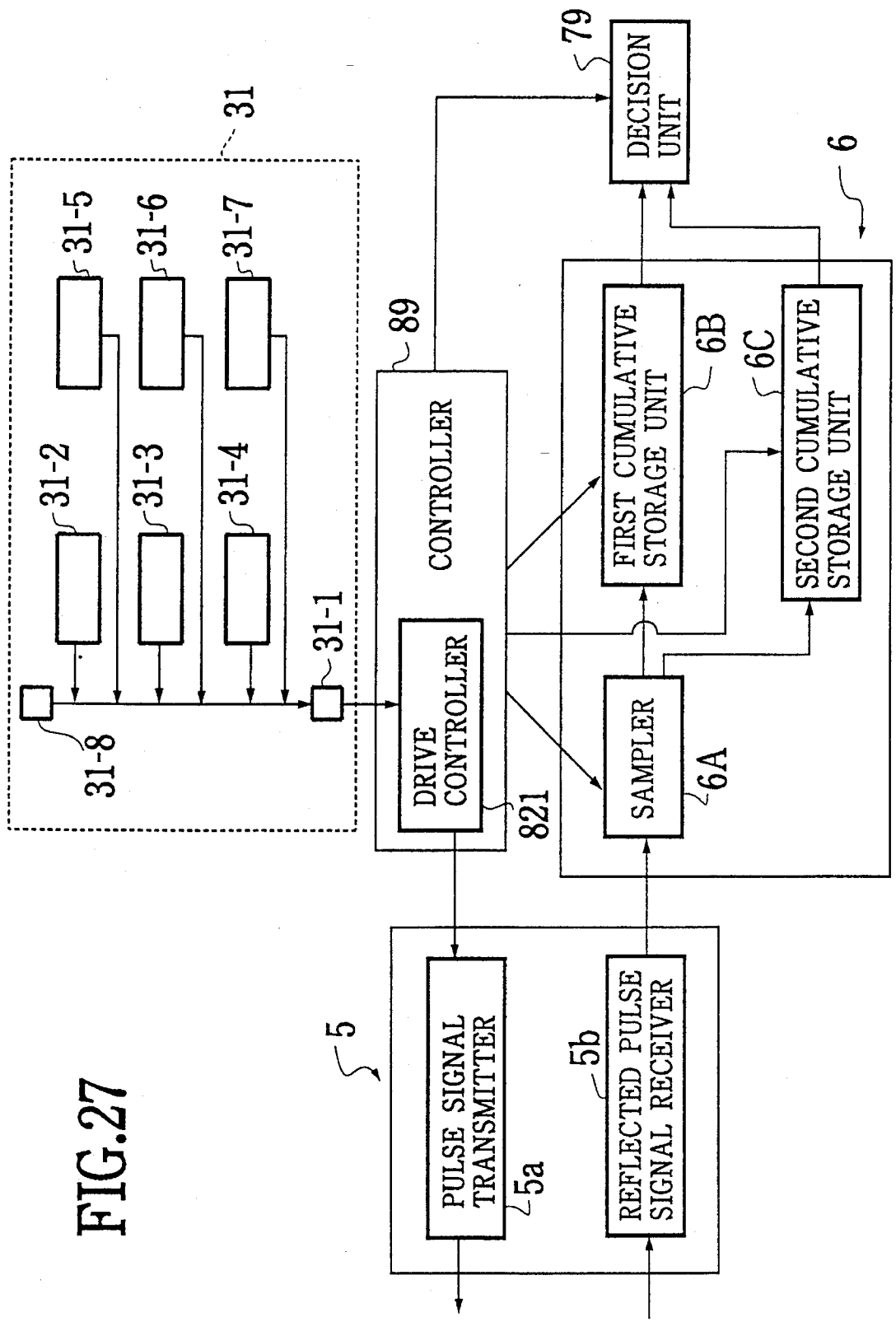
FIG. 27 is a block diagram showing a fourth embodiment of the present invention.

The fifth embodiment of the present invention will be explained with reference to the drawings. FIG. 27 is a block diagram showing the fifth embodiment. In the figure, the same parts as those of the fourth embodiment such as the radar head, cumulative storage unit, decision unit, and controller are represented with like reference marks, and their explanations will not be repeated. A drive controller 821 has a function of instructing a sampler 6A to sample noise, a function of counting the number of operations (for example, 8192) of detecting noise levels after sampling a reflected signal, a function of terminating the noise level detecting operations according to the count, and a function of counting trigger pulses provided by a trigger generator 8C and suspending a pulse signal transmitter 5a at every predetermined number of trigger pulses, similar to the fourth embodiment. The fifth embodiment differs from the fourth embodiment in that it has a function of controlling the start or end of the noise level detecting operations in response to an instruction provided by an external controller 31. The external controller 31 has a notify unit 31-1 for notifying the drive controller 821 of the start of noise sampling, an illuminance sensor 31-2 for measuring environmental illuminance, a temperature sensor 31-3 for measuring an ambient temperature and the temperature of the radar proper, a wiper switch 31-4 for monitoring the operation of a wiper, a raindrop sensor 31-5 for sensing whether or not there are raindrops or the quantity of raindrops, a timer 31-6 for measuring time, an ignition switch 31-7 for recognizing the operations of a car on which the radar apparatus is mounted, and a manual switch 31-8. The notify unit 31-1 may have a threshold for determining whether or not the sensors 31-2, 31-3, 31-5, and 31-6 are providing an output, and a function of recognizing the ON/OFF states of the switches 31-4, 31-7, and 31-8. The threshold and function may be included in these sensors and switches.

Figure 28:
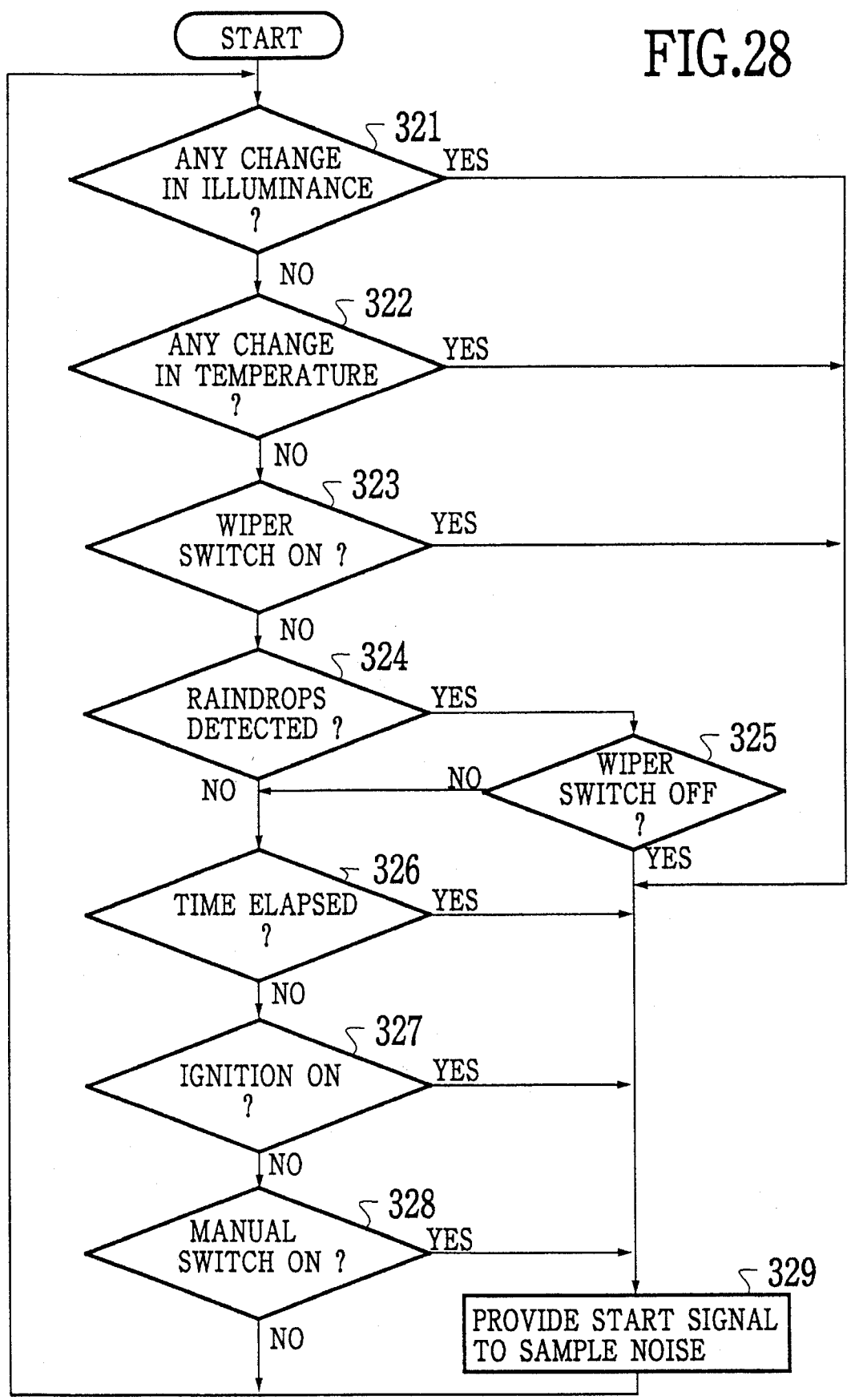
FIG. 28 is a flowchart showing steps carried out by the fourth embodiment.

FIG. 28 is a flowchart showing steps carried out by the fifth embodiment. Step 321 determines whether or not there is a change in illuminance. If YES, step 329 starts to sample noise, and then the step 321 is repeated. If there is no change in illuminance, step 322 determines if there is a change in temperature. If YES, the step 329 starts to sample noise, and then the step 321 is repeated. If there is no change in temperature, step 323 determines if the wiper switch 31-4 has been turned ON. If YES, the step 329 starts to sample noise, and the flow returns to the step 321. If the wiper switch 31-4 has not been turned ON, step 324 determines if there are raindrops. If YES, step 325 determines whether or not the wiper switch 31-4 has been turned OFF. If there are no raindrops, step 326 is carried out. If the step 325 determines that the wiper switch 31-4 has been turned OFF, the step 329 starts to sample noise, and the flow returns to the step 321. If the wiper switch 31-4 has not been turned OFF, the step 326 is carried out. The step 326 determines if a predetermined time has passed. If YES, the step 329 starts to sample noise, and the flow returns to the step 321. If the predetermined time has not passed, step 327 determines if the ignition switch 31-7 has been turned ON. If YES, the step 329 starts to sample noise, and the flow returns to the step 321. If the ignition switch has not been turned ON, step 328 determines whether or not the manual switch 31-8 has been turned ON. If YES, the step 329 starts to sample noise, and the flow returns to the step 321. If the manual switch 31-8 has not been turned ON, the flow returns to the step 321.

In this way, the fifth embodiment employs the external controller 31 for controlling the drive controller 821 for controlling whether or not noise must be sampled. The external controller 31 involves the illuminance sensor 31-2, temperature sensor 31-3, wiper switch 31-4, raindrop sensor 31-5, timer 31-6, ignition switch 31-7, and manual switch 31-8. Accordingly, the fifth embodiment is capable of changing thresholds for detecting a reflected pulse from a target whenever noise is caused due to sunlight, temperature, raindrops, engine, alternator, and fluctuations in a power source voltage. Accordingly, the fifth embodiment always correctly catches a reflected pulse from a target, measures a distance to the target, and calculates the relative speed of the target. The fifth embodiment freely sets thresholds for detecting a reflected pulse from a target according to environmental conditions or driver's request. The fifth embodiment employs a simple arrangement to prevent erroneous detection due to noise, accurately measure a distance, and calculate a relative speed.

Figure 29:
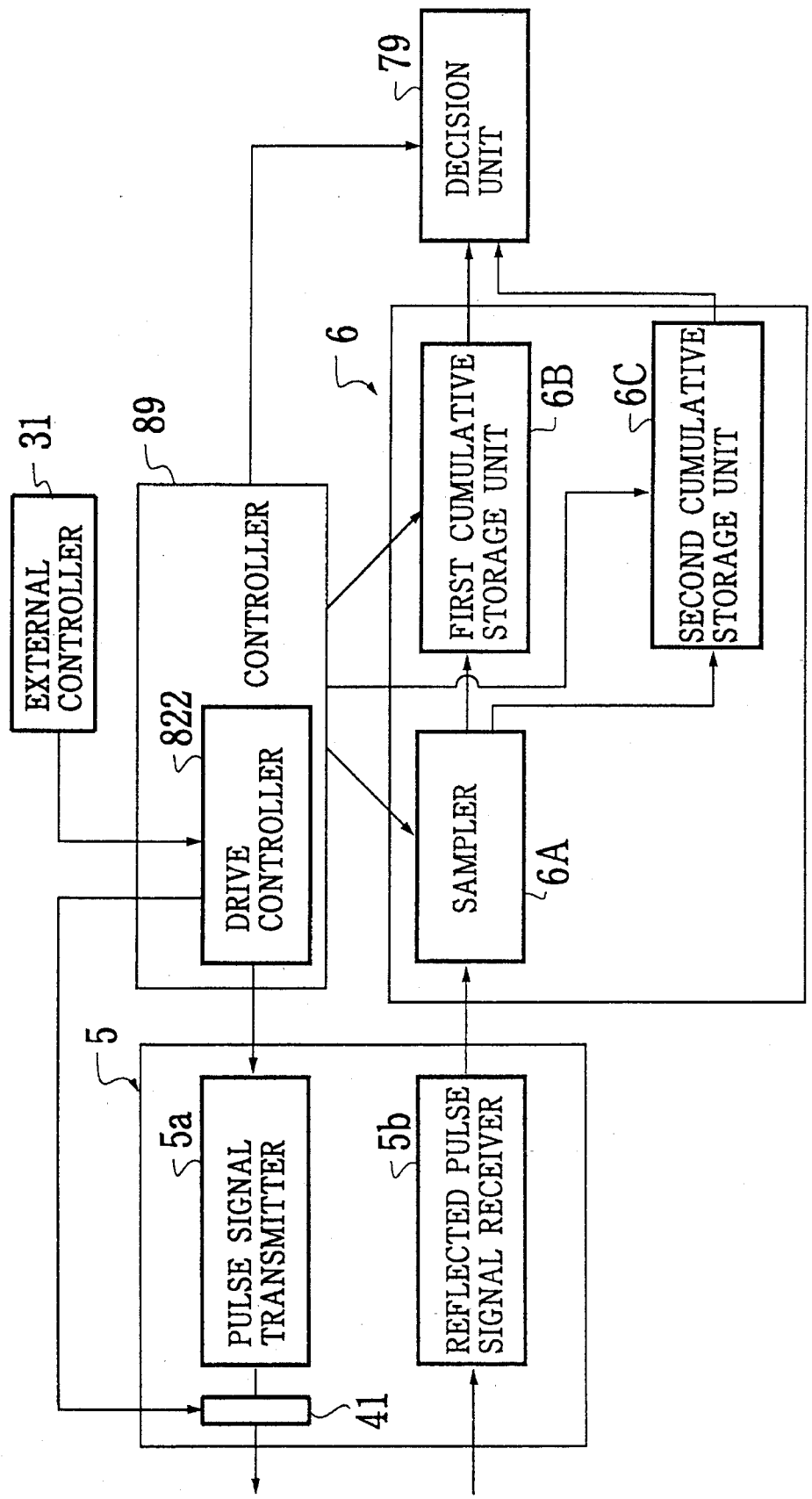
FIG. 29 is a block diagram showing a fifth embodiment of the present invention.

The sixth embodiment will be explained with reference to the drawings. FIG. 29 is a block diagram showing the sixth embodiment. In the figure, the same parts as those of the fourth embodiment such as the radar head, cumulative storage unit, decision unit, and controller are represented with like reference marks, and their explanations will not be repeated. A drive controller 822 recognizes the sampling timing of noise according to an internal instruction provided by a controller 89 or an external instruction provided by the external controller 31 of FIG. 27. The drive controller 822 controls a shutter 41. The shutter 41 is a liquid crystal shutter or a mechanical shutter. In response to an instruction from the drive controller 822, the shutter 41 is opened and closed to control the transmission of a pulse signal provided by a transmitter 5a.

Figure 30:
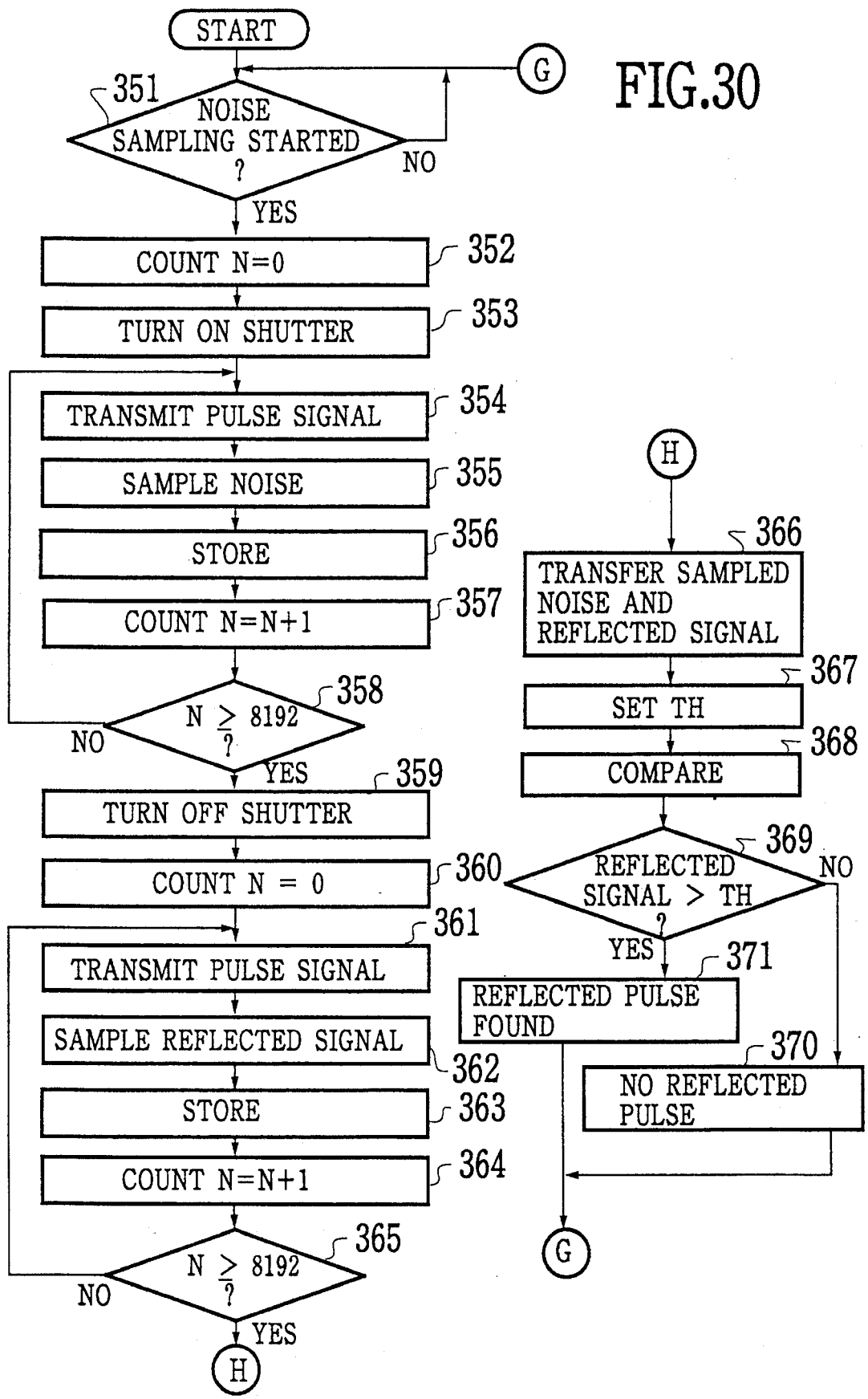
FIG. 30 is a flowchart showing steps carried out by the fifth embodiment.

FIG. 30 is a flowchart showing steps carried out by the sixth embodiment of the present invention. Step 351 determines whether or not a signal to start sampling noise has been provided. If YES, step 352 zeroes a counter, and step 353 turns ON, i.e., closes the shutter 41. Step 354 causes the transmitter 5a to transmit a pulse signal. Since the shutter 41 is closed, the pulse signal is blocked. Step 355 drives a receiver 5b to sample noise. Step 356 accumulates the sampled noise in a second cumulative storage unit 6C. Step 357 increments the counter to N+1. Step 358 determines if $N \geq 8192$. If $N < 8192$, the flow returns to the step 354. If $N \geq 8192$, step 359 turns OFF, i.e., opens the shutter 41. Step 360 zeroes the counter, and step 361 transmits the pulse signal from the transmitter 5a. Since the shutter 41 is open, the pulse signal is transmitted outside. Step 362 drives the receiver 5b to sample a reflected pulse signal from a target. Step 363 accumulates the sampled signal in a first cumulative storage unit 6B. Step 364 increments the counter to N+1. Step 365 determines if $N \geq 8192$. If $N < 8192$, the flow returns to the step 361. If $N \geq 8192$, step 366 transfers the sampled noise and signal to a decision unit 79. Step 367 detects noise levels according to the sampled noise, and according to the noise levels, sets thresholds for detecting a reflected pulse. Step 368 compares the thresholds with the sampled signal. Step 369 determines whether or not there is any sampled value that exceeds the thresholds. If there is no data that exceeds the thresholds, step 370 determines that there is no reflected pulse, and the flow returns to the step 351. If there is a value that exceeds the thresholds, step 371 determines that there is a reflected pulse, and the flow returns to the step 351.

The sixth embodiment arranges the shutter 41 in front of the transmitter 5a. The shutter 41 is opened and closed in response to an external signal. When the shutter 41 is closed, noise is detected. Accordingly, the thresholds for detecting a reflected pulse from a target are changed according to noise due to sunlight, temperature, rain, engine, alternator, fluctuations in a power source voltage, etc. The thresholds may be changed according to driver's requirements. The sixth embodiment is capable of always correctly catching a reflected pulse from a target. The sixth embodiment employs a simple arrangement to prevent erroneous detection due to noise, correctly measure a distance, and calculate a relative speed. The step 365 is not limited to determine if N-8192. With a greater number to check N, it is possible to sample noise once after transmitting a plurality of pulses, or sample noise s times after transmitting k pulses. The sixth embodiment employs a simple arrangement to accurately measure a distance and speedily calculate a relative speed.

Figure 31:
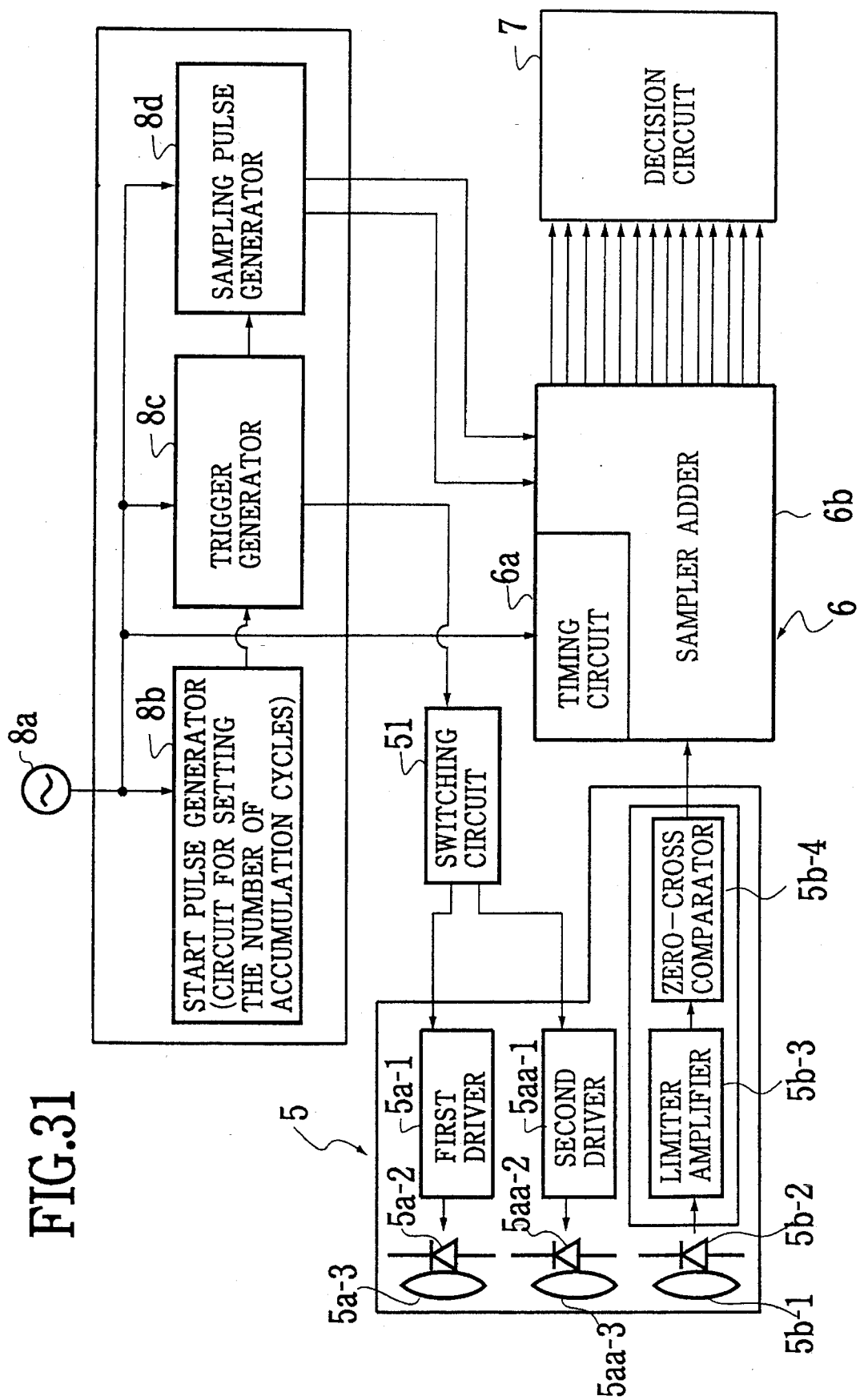
FIG. 31 is a block diagram showing a sixth embodiment of the present invention.

The seventh embodiment of the present invention will be explained with reference to the drawings. FIG. 31 is a block diagram showing the seventh embodiment. In the figure, the same parts as those of the first embodiment are represented with like reference marks and their explanations will not be repeated. A radar head 5 of this embodiment has two pulse signal transmitters 5a and 5aa having the same arrangement. The transmitter 5a includes a series circuit of a first driver 5a-1, a light emitting element 5a-2, and a lens 5a-3. The transmitter 5aa includes a series circuit of a second driver 5aa-1, a light emitting element 5aa-2, and a lens 5aa-3. The light emitting elements 5a-2 and 5aa-2 may be LEDs or semiconductor laser diodes. Pulse signals from the transmitters 5a and 5aa may be electromagnetic or sonic wave signals. In this case, elements for transmitting the electromagnetic or sonic wave signals must be employed instead of the light emitting elements. A switching circuit 51 receives a trigger pulse from a trigger generator 8c, to acknowledge the timing of a pulse signal to be transmitted outside, and alternately provides the first and second drivers 5a-1 and 5aa-1 with the trigger pulse. It is possible to arrange three or more transmitters, or an array of transmitters. FIG. 32 is a timing chart showing the seventh embodiment. Once a controller 8 provides a detection start signal, a trigger pulse (1) is provided at every four microseconds. A pulse 201 is transmitted in response to every odd trigger pulse (1), and a pulse 202 is transmitted in response to every even trigger pulse (1). If there are three or more light emitting elements, they alternately emit pulses at intervals of four microseconds. Namely, the controller 8, switching circuit 51, and drivers 5a-1 and 5aa-1 alternately drive the transmitters at predetermined intervals. For example, let's consider the case that 14 sampling pulses (4) are provided. The interval of the sampling pulses corresponds to 10 meters. A cumulative storage signal (S) is provided when no sampling pulse is S provided. While the signal (5) is being provided, sampled data are accumulated and stored. According to the seventh embodiment, the switching circuit 51 alternately provides the first and second drivers 5a-1 and 5aa-1 with a trigger pulse, so that the number of activations of the light emitting element 5a-2 is halved due to the light emitting element 5aa-2. With the simple arrangement, the seventh embodiment doubles the service lives of the light emitting elements 5a-2 and 5aa-2. This results in improving the durability and reliability of the light emitting elements 5a-2 and 5aa-2. If one of the light emitting elements is broken during operation, the other element may accumulate and store data at a sampling interval of eight microseconds that is double the normal interval of four microseconds. This secures safety driving. As explained with reference to the first embodiment, the light emitting elements may have small output power, to easily improve the durability of the light emitting elements. The seventh embodiment further improves the durability and safety of the elements.

Although the present invention has been explained in connection with the optical radar apparatuses employing LEDs and semiconductor laser diodes, the present invention is also applicable to radio, ultrasonic, and sound wave radar apparatuses employing radio and sonic wave transmitters instead of the light emitting elements. In the case of the radio radar apparatus, a short-wave electromagnetic wave is preferable in terms of directivity and interference with other frequencies. Since the present invention works with a transmission pulse signal of small output power, it may employ electromagnetic waves in a millimeter band or a sub-millimeter band. Oscillation and amplification elements such as GaAs FET, HEMT, and HBT are employable as radio wave transmitters.

What is claimed is:

1. A radar apparatus comprising:
   (a) means for transmitting an output signal such as one of optical, electromagnetic, and sonic wave signals;
   (b) means for controlling and driving said transmission means;
   (c) means for receiving a reflected signal such as one of optical, electromagnetic, and sonic wave signals;
   (d) means for sampling the received signal at predetermined intervals;
   (e) means for accumulating data according to the contents of a first sampled signal sampled by said sampling means while said transmission means is operating as well as a second sampled signal sampled by said sampling means while said transmission means is inactive;
   (f) first storage means for storing the accumulated data based on the first sampled signal;
   (g) second storage means for storing the accumulated data based on the second sampled signal;
   (h) means for controlling said sampling means and first and second storage means;
   (i) means for detecting all levels of the accumulated data stored in said second storage means and employing the levels as thresholds for determining whether or not the accumulated data stored in said first storage means contain a reflected signal from an external target; and
   (j) means for reading the accumulated data out of said first and second storage means and determining whether or not the accumulated data contain the reflected pulse from the target according to the thresholds.

2. A radar apparatus as claimed in claim 1, further comprising external control means for controlling said control and drive means according to external control signals.

3. A radar apparatus as claimed in claim 2, wherein said external control means has at least one of means for measuring illuminance around said reception means, means for measuring an ambient temperature around said reception means and the temperature of said reception means, means for recognizing the operation of a wiper of a car on which the radar apparatus is mounted, means for recognizing weather, means for measuring a predetermined time elapsed, means for recognizing the operating conditions of the car, and a manual switch.

4. A radar apparatus as claimed in claim 1, wherein said illumination means is provided with shutter means such as a liquid crystal shutter or a mechanical shutter to be opened and closed according to control signals.

* * * * *